United States Patent [19]

McCutcheon

[11] 4,218,735
[45] Aug. 19, 1980

[54] DIGITAL MOTOR CONTROL SYSTEM

[75] Inventor: James T. McCutcheon, Woodbury, Minn.

[73] Assignee: Minnesota Mining and Manufacturng Company, St. Paul, Minn.

[21] Appl. No.: 948,829

[22] Filed: Oct. 5, 1978

[51] Int. Cl.² .......................................... G06F 15/46
[52] U.S. Cl. ...................... 364/118; 355/14 R; 364/110; 318/329
[58] Field of Search ............... 364/118, 565, 107, 110, 364/514, 518; 318/310, 329, 341, 345 A, 345 E, 601, 59, 61, 64, 66, 90; 355/8, 14

[56] References Cited
U.S. PATENT DOCUMENTS

| | | |
|---|---|---|
| 3,793,511 | 2/1974 | Bala et al. ........................... 364/118 |
| 3,818,297 | 6/1974 | Ha ........................................ 318/331 |
| 3,820,893 | 6/1974 | Donohue ............................... 355/14 |
| 4,000,943 | 1/1977 | Bar-on ..................................... 355/8 |
| 4,090,116 | 5/1978 | Lippitt ............................ 364/118 X |
| 4,099,113 | 7/1978 | Hayashi .......................... 364/118 X |
| 4,104,570 | 8/1978 | Hamby et al. ................... 318/329 X |
| 4,129,377 | 12/1978 | Miyamoto et al. ..................... 355/14 |

Primary Examiner—Joseph F. Ruggiero
Attorney, Agent, or Firm—Cruzan Alexander; Donald M. Sell; William D. Bauer

[57] ABSTRACT

A digital motor control system is provided to regulate the speed of a variable speed motor. Information concerning the speed and acceleration of the variable speed motor is used to generate a correction signal which causes the measured speed of the variable speed motor to approach the desired target speed.

3 Claims, 1 Drawing Figure

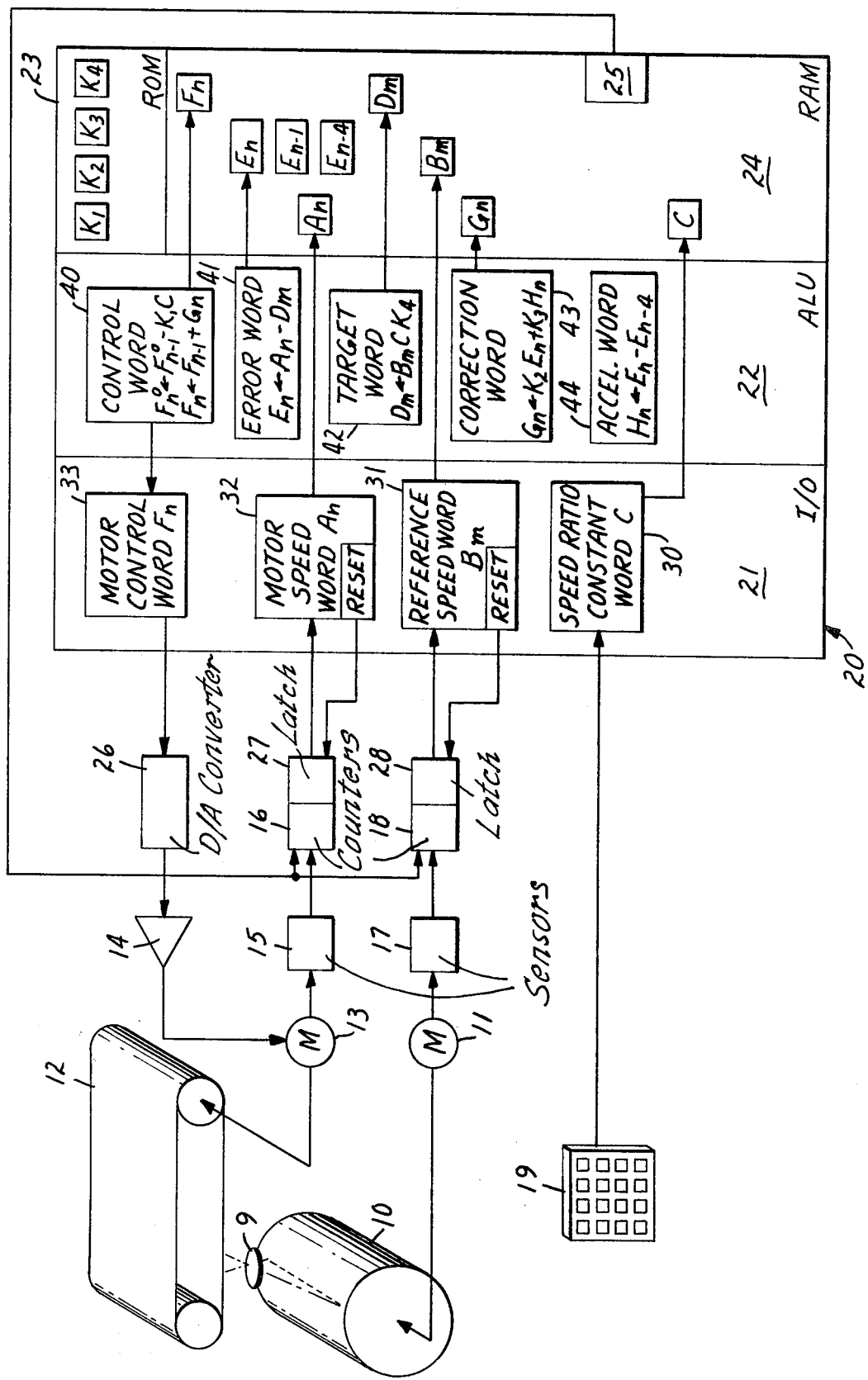

DIGITAL MOTOR CONTROL SYSTEM

BACKGROUND OF THE INVENTION

1. Field of the Invention

This invention relates to a motor control system to be used for regulating the speed of a variable speed motor, and is more particularly directed to a system for controlling the speed of a scan motor as used in a variable magnification ratio photocopier.

2. Description of the Prior Art

In conventional motor control systems the measured speed of the motor is compared with the desired speed of the motor and the feedback signal directly proportional to this difference in speed is applied to force the motor to approach the target speed. Although this form of motor control is adequate for most uses, it is incapable of providing the close control of the motor speed which is required for driving a movable scanning system in a variable magnification ratio photocopier.

The typical variable magnification ratio photocopier includes a movable scanning system, a lens system, and a rotable photosensitive drum. The scanning system cooperates with the lens system to transmit an image of an original document to the surface of the photosensitive drum. To obtain an enlarged or reduced copy of this original document, the lens system must first be correctly positioned with respect to the scanning system, and then the speed of the scanning system must be adjusted to the correct speed ratio with respect to the speed of the photosensitive drum. Once the scanning system has been accelerated from rest to the scanning speed, close control over the scanning speed must be maintained to achieve an accurate photocopy.

This is achieved in prior art photocopiers by providing mechanical linkage between the scanning system and the rotable photosensitive drum surface. This prior art approach suffers from two defects. First, it is difficult to provide more than a small number of discrete magnification ratios when utilizing a mechanical system. Secondly, the optical performance of the photocopier deteriorates as the mechanical systems wear which necessitates periodic maintenance.

SUMMARY OF THE INVENTION

In contrast to the systems of the prior art the digital motor control system of the present invention utilizes digital techniques to develop the control signals for a variable speed motor which is used to drive the movable scanning system of the photocopier. This motor control system provides at least three distinct advantages over a mechanical system. First, the digital motor control system provides accurate and stable optical performance of the photocopier. Secondly, the system permits automatic compensation for mechanical wear of the mechanical components of the photocopier. And thirdly, the control system permits selection of a large number of magnification ratios.

Information which is processed by the digital motor control system is expressed and manipulated in the form of digital words. The digital motor control system includes a variable speed motor and means for sensing the rotational speed of this motor. The measured rotational speed of the motor is expressed as a motor speed word. Means are provided for producing a target word which is indicative of the desired motor speed. Means for comparing the motor speed with the target word and calculating a motor control word from the data are provided. Means responsive to this motor control word are provided for driving the variable speed motor.

The operation of the comparing means described above is improved by providing means for sequentially comparing the motor speed word with the target word to form a succession of error words. These error words are indicative of the deviation of the measured motor speed from the desired or target motor speed. By providing means for successively storing sequential values of the error word and subsequently comparing the sequential error words with each other, an acceleration word is produced. In this manner, information concerning the instantaneous velocity and acceleration of the motor is developed. Based upon this information a correction word is calculated, which contains information concerning both the speed of the motor as well as the acceleration rate of the motor. Means are provided to alter the control word which regulates the speed of the motor by an amount proportional to the correction word such that the speed of the variable speed motor converges with the desired motor speed as represented by the target speed word.

In many applications the target speed word which represents the desired speed for the motor may not be constant and may fluctuate with time. In the preferred embodiment the motor control system is utilized to control the speed of a variable speed motor used to drive the movable scanning system of a variable magnification ratio photocopier. As described above, accurate reproduction of enlarged or reduced copies requires the speed of the scanning system be accurately synchronized with the rotational speed of the photosensitive drum. Consequently, the target speed for the scanning system must reflect the measured speed of the photosensitive drum and the desired speed ratio between the photosensitive drum and the scanning system. In the preferred embodiment this requirement is met by providing means for sensing the rotational speed of the photosensitive drum and generating a reference speed word which is indicative of the measured speed of the drum. Further, in this embodiment data reflecting the desired magnification ratio for the photocopy is entered and is represented as a speed ratio constant word. This data is used to calculate a target word which will reflect the desired speed for the scanning system with regard to the desired magnification ratio and the measured speed of the photosensitive drum. Once the target word has been developed the motor control sequence proceeds as described above.

BRIEF DESCRIPTION OF THE DRAWING

The FIGURE is a combined block and pictorial diagram representing the preferred embodiment of the present invention.

DETAILED DESCRIPTION OF THE PREFERRED EMBODIMENT

In the FIGURE the digital scan motor control system and associated photocopier components are shown in block diagram form. The photocopier includes a movable photosensitive surface represented by a rotable drum 10 driven by a constant speed drum motor 11. Graphic information conveyed by a system 12 is transmitted to the photosensitive surface by a lens system 9. This scanning system is driven by a variable speed motor 13 which is responsive to the output of an analog amplifier 14. The analog amplifier 14 amplifies an analog signal produced by digital to analog converter 26.

Sensing means 15 are associated with the variable speed motor 13 to provide an indication of scan motor speed. A sensor 15 such as a photoelectric cell is interfaced with a digital counter 16 which in turn is interfaced with a digital latch 27. These components coact to represent the speed of motor 13 in digital form. Likewise, a sensor 17 is associated with drum drive motor 11 to sense the rotational speed of the photosensitive drum 10. Sensor 17 is interfaced with a digital counter 18 and digital latch 28 to develop a digital representation of the speed of the photosensitive drum 10.

An input device 19 shown as a keyboard is provided for entering magnification ratio data. This input device 19 as well as the digital latches 27, 28 and the D to A converter 26 are interfaced to an input/output device 21.

This input/output (I/O) device 21 is one component of a microprocessor system generally designated 20. Other elements of the microprocessor system include an arithmetic logic unit (ALU) 22, a random access memory (RAM) 24, a system clock 25 and a programmable read only memory (ROM) 23.

This microprocessor system 20 accepts input data concerning the speeds of the photosensitive drum and the scanning system as well as the magnification ratio data and utilizes this information to calculate a motor control signal which is coupled to the D/A converter to regulate the speed of the variable speed motor.

The data which is utilized by this control system is represented and manipulated in the form of digital words. In the specific embodiment, the data is represented as signed binary numbers grouped into eight bit words. The resolution offered by this encoding scheme has been sufficient to achieve close control over the scanning system speed.

Data developed by the hardware external to the microprocessor system 20 is interfaced with the microprocessor system through the I/O device 21. The I/O device has, in the preferred embodiment, four ports 30-33. This device permits reading and writing data to and from external devices. The reading and writing processes are performed under software control and involve the use of the ALU 22 to fetch data from the I/O device 21 and either manipulate it directly or transfer it to memory for later use. A system clock 25 is provided and is required for both timing sequences used within the microprocessor system itself and for providing an accurate and stable time base for the counters 16 and 18.

The data which is read and manipulated results in the formation of a motor control word which is outputted through the I/O port 33 to the D to A converter 26 which converts the digital information into an analog signal. This analog signal is amplified by an amplifier 14 and is used to drive the variable speed motor 13. The control sequence which results in the calculation of the motor control word is performed and is best understood in a step-wise fashion. However, a brief summary of the operation of the digital motor control system as used in a variable magnification ratio photocopier will aid in an understanding of the step-wise description.

As described before, the accurate reproduction of copies in a variable magnification ratio photocopier requires that the speed of the scanning system be accurately controlled as a function of the speed of the photosensitive drum surface. Thus, for a given magnification ratio there exists unique scanning system velocity which must be achieved and maintained. This unique scanning system speed is referred to as the target speed. The target speed which may be constant in some embodiments, but which in the preferred embodiment, depends upon both the desired magnification ratio and the rotational speed of the drum. At the beginning of a scanning cycle, the scanning system is at rest and the photosensitive drum member is rotating at approximately a constant rotational speed.

The first task for the motor control system during the start-up phase at the initiation of a scanning cycle is to accelerate the scanning system as rapidly as possible from rest to a speed close to the desired scanning speed. This task is accomplished by first inputting a desired magnification ratio data from keyboard 19 into I/O port 30. The ALU 22 transfers the magnification data, which is represented as speed ratio constant word C, into the RAM memory 24. The value of this speed ratio constant word multiplied by an empirically derived constant $K_1$, is used to decrement sequential values of a control word $F°$. As shown in control word block 40, $F°$ refers to the start-up phase and the subscripts n, n−1, etc. refer to the successive increments, which are empirically determined to be sufficient to result in both the control word $F°_n$ and the starting speed of the scan motor to be within allowed ranges of their respective values for acceptable control. For example, in a preferred embodiment, eleven such increments are used, each at ca. 8 msec. spacings. After a series of decrements of the control word $F°$, the scan motor 13 is accelerated to within an acceptable speed range. At the same time, the control word $F°$ reaches an equally acceptable value, thus completing the start-up phase.

Throughout this description, the direction of the arrows indicates the flow of information through the control system. For example, the calculation of the initial value of the control word previously explained proceeds as follows. Magnification ratio data from keyboard 19 is introduced into I/O port 30 as is indicated by the arrow connecting the two. This data is represented as a speed ratio constant word C, shown coupled to the I/O port 30. This word is transferred through the ALU 22 into random access memory 24 as indicated by the arrow. Next, an initial value for the control word $F°$ is calculated in the ALU 22 by fetching the speed ratio constant word C and multiplying it by an empirically derived constant $K_1$, which is stored in read only memory (ROM) 23. The operation which multiplies $K_1$ by C and the arrow which connects the two with $F°_n$, as shown in the diagram, indicates that the quantity $F°_{n-1}$ and the product $K_1C$ are combined to the control word $F°_n$. The arrow connecting the control word $F_n$ in the ALU with the control word in the I/O port 33 represents a data transfer from the ALU 22 to the I/O port 33. The arrow connecting the motor control word $F_n$ in the I/O port 33 with the digital to analog converter 26 indicates the transfer of digital information from the I/O port 33 into the D to A converter 26. The arrow connecting the D to A converter 26 with the analog amplifier 14 indicates the transfer of analog information proportional to the digital information. Similarly, the arrow connecting the analog amplifier 14 with the motor indicates that the analog amplifier drives motor 13 to control its speed.

Once the variable speed scan motor 13 is traveling at approximately the correct scanning speed, the second phase begins and error correction procedures of the motor control system are initiated. The first step in the second phase is to sense the rotational speed of the drum drive motor 11 by sensor 17. In preferred embodiment, sensor 17 is a conventional magnetic pickup. The output of the sensor 17 is a pulse signal whose repetition rate is inversely proportional to the rotational speed of motor 11. The output of sensor 17 is applied to the counter 18 which is a free-running binary counter. This counter counts clock pulses generated by the system clock 25 for a time period determined by the pulse repetition rate of sensor 17. Consequently, the number of counts between successive increments m is inversely proportional to the speed of the photosensitive drum 10. The value of the binary number contained within the counter 18 is stored within latch 28. The latch is interfaced with the I/O port 31 and when that I/O port location is read by the ALU 22, the value of the latch, referred to as the reference speed word $B_m$, is transferred through the ALU 22 and stored in RAM 24. Since the drum motor 11 is not synchronously driven with the scan motor 13, the increments n and m are not necessarily the same. Successive values of the reference speed word $B_m$ are obtained by subtracting sequential values of the latch 28, such that at a constant drum speed, the reference speed word $B_m$ is similarly constant. At this point, sufficient information has been introduced into the microprocessor 20 to permit the calculation of a target word $D_m$. The product of the reference speed word $B_{m1}$, the speed ratio constant word C and a constant $K_4$ are multiplied to form the target word $D_m$ as shown in target block 42. The constant $K_4$ is a normalization factor between the drum motor and scan motor speeds, and represents the various gear ratios and the like used in coupling the scan motor 13 to the scanning system 12. The target word $D_m$ thus represents the desired speed for the scan motor 13.

The speed of the scan motor 13 is measured by a sensor 15 coupled to a counter 16 and latch 27. These elements cooperate as described with respect to the drum motor system to generate a motor speed word $A_n$ which may be read from the I/O port 32. Successive values of the motor speed word $A_n$ are likewise derived from sequential values of the latch 27 such that as the actual speed of the scan motor 13 changes, the value of the speed word $A_n$ is changed. The successive values of $A_n$ are then transferred by the ALU 22 into RAM 24.

An error word $E_n$ representing the difference between the previously described motor speed word $A_n$ and the target speed word $D_n$ is next derived as shown in error word block 41. Sequential values of the error word $E_n$, $E_{n-1}$ and $E_{n-4}$ are transferred to RAM 24. Once sequential values have thus been stored in memory, the acceleration word H is calculated by subtracting the error word $E_n$ from the error word $E_{n-4}$, i.e., four increments earlier, as shown within acceleration word block 44. This ensures that a sufficiently large time span is included such that the scanning system respond to changes in the control word $F_n$. Finally, the correction word $G_n$ is calculated by multiplying the acceleration word $H_n$ by an empirically derived constant $K_3$ and adding this to the product of the error word $E_n$ multiplied by another empirically derived constant $K_2$ as shown in correction word block 43. The correction word $G_n$, which is the sum of these two products thus contains both acceleration and velocity information.

This correction word is used to alter successive values of the control word $F_n$ by taking the algebrative sum of the previous value $F_{n-1}$ and the correction word $G_n$ as shown in block 40. The successive values of $F_n$ are outputted through the I/O port 33 to alter the speed of scan motor 13 as described above.

This error correction process is repeated periodically at a rate matching the pulse rate of the scan motor sensor 15 and provides updated information to the scan motor 13 throughout the scan cycle.

In a specific embodiment, the control word is updated at a rate which corresponds to approximately 0.030 inch (0.76 cm) movement of the scanning system. The frequent updating of the control word achieves close control and accurate synchronization between the scanning system 12 and the rotation of the photosensitive drum 10.

It is important to note that the value of the control word $F_n$ "floats" and its magnitude depends on the drag that the scan motor must overcome as well as on any change in speed of the drum 10. As a consequence, the average value of the scan motor word $F_n$ may vary between ostensibly identical machines. Also, the value of the control word may vary over the course of a single scan cycle. Accordingly, variations of the control word may be used as a diagnostic tool to monitor the mechanical condition of the scanning system. The automatic compensation feature provided by the "floating" value of the control word also permits the control system to adapt for the mechanical wear of the photocopier as it ages. This feature also obviates the need to make final adjustments of the mechanical systems of photocopiers on the production line, thus reducing the manufacturing costs for the photocopiers.

The digital motor control system is preferably implemented with the 8085 microcomputer system manufactured by and available from Intel Corp., 3065 Bowers Ave., Santa Clara, California. A partially documented assembly language listing of software used in the present invention is filed with the patent application.

```
LOC  OBJ         SEQ        SOURCE STATEMENT

1 ;
                 2 ;       T.R.S. CONTROL PROGRAM
                 3 ;         REVISED 9/26/78    REV 1
                 4 ;
                 5 ;************************************************
                 6 ; NOTE. VALUES TO ENABLES,OUTPUTS,&COUNTERS ARE
                 7 ;        COMPLEMENTED
                 8 ;************************************************
                 9 ; CONSTANTS BELOW ARE USED WITH SBC 80-04
                10 ;************************************************
0000            11         ORG    0H
                12 ;************************************************
0001            13  K4     EQU    01H        ;PORT 1 - GP INPUT
0003            14  K5     EQU    03H        ;PORT 3 - CONTROL
0002            15  K6     EQU    02H        ;PORT 2 - GP OUTPUT
003F            16  K7     EQU    3FH        ;H REG - RAM ADDR
3F00            17  K8     EQU    3F00H      ;LOWEST RAM ADDR
0000            18  K10    EQU    00H        ;8155 CONTROL REG ADDR
0004            19  K11    EQU    04H        ;COUNTER LSB ADDR
3FFF            20  K12    EQU    3FFFH      ;UPPER RAM ADDR
0005            21  K13    EQU    05H        ;80-04 MSB/CMD ADDR
0000            22  K14    EQU    00H        ;8155 CONTROL REG ADDR
00F5            23  K15    EQU    0F5H       ;COUNTER LSB
0080            24  K16    EQU    80H        ;COUNTER MODE & MSB
00CE            25  K17    EQU    0CEH       ;COUNTER MODE - START
004E            26  K18    EQU    4EH        ;8155 MODE WORD
0020            27  K19    EQU    20H        ;RIM INSTRUCTION - 8085
0030            28  K20    EQU    30H        ;SIM INSTRUCTION - 8085
                29 ;************************************************
                30 ;    INITIALIZE SYSTEM
                31 ;************************************************
0000 F3         32  00.    DI                ;DISABLE INTERRUPTS
0001 31FF3F     33         LXI    SP,K12     ;SET STACK POINTER
0004 3E4E       34         MVI    A,K18      ;CONTROL WORD
0006 D300       35         OUT    K10        ;MODE REGISTER
0008 3E16       36         MVI    A,16H      ;MASTER CLEAR
000A D303       37         OUT    K5         ;ALL OUTPUT LATCHES OFF
000C AF         38         XRA    A          ;ZERO ALL RAM
000D 06F0       39         MVI    B,0F0H     ;LOOP CNTR
000F 21EF3F     40         LXI    H,K8+0EFH  ;START ADDR
0012 CD2000     41         CALL   RAM1
0015 CD2600     42         CALL   RAM3
0018 2E40       43         MVI    L,40H      ;MPXCNTR
001A 34         44         INR    M          ;SET - 1
001B 2E43       45         MVI    L,43H      ;STATUS REG
001D 3608       46         MVI    M,8H       ;SET FUNC PENDING BIT
001F 2E45       47         MVI    L,45H      ;LENGTH REG
0021 3650       48         MVI    M,50H      ;15.0 STD LNTH (10 + 5.0)
0023 C30700     49         JMP    CNTR
                50 ;
                51 ;************************************************
                52 ;   LOAD RAM LOCATIONS
```

```
LOC  OBJ        SEQ       SOURCE STATEMENT

53 ;************************************************
                54 ;
0026 2E4F       55 RAM3.   MVI    L,4FH      ;#8 OUTPUT
0028 0609       56         MVI    B,9H       ;LOOP CNTR
002A 3EFF       57         MVI    A,0FFH     ;ALL OFF VALUE
002C 77         58 RAM1.   MOV    M,A
002D 05         59         DCR    B
002E C8         60         RZ
002F 2D         61         DCR    L
0030 C32C00     62         JMP    RAM1
                63 ;
                64 ;************************************************
0033 00         65         NOP
0034 C33F00     66         JMP    INT        ;00-04 CPU REST6.5
0037 00         67         NOP
0038 C33F00     68         JMP    INT        ;00-10 CPU REST7
003B 00         69         NOP
003C C3A002     70         JMP    INT1       ;00-04 TIMER REST7.5
                71 ;************************************************
                72 ;VECTOR TO PROPER INTERRUPT SUBROUTINE AND
                73 ;SAVE INT.# IN B REG
                74 ;************************************************
003F F3         75 INT:    DI
0040 3E09       76         MVI    A,9H
0042 D303       77         OUT    K3         ;ACTIVATE #6 ENABLE LINE
0044 DB04       78         IN     K4         ;INPUT INTERRUPT CODE
0046 07         79         RLC
0047 DA8300     80         JC     INT7
004A 07         81         RLC
004B DAA001     82         JC     INT6
004E 07         83         RLC
004F DA8002     84         JC     INT5
0052 0608       85         MVI    B,8H       ;JAM CODE
0054 C35F03     86         JMP    JAM
                87 ;************************************************
                88 ; SET UP COUNTERS, CLEAR INTERRUPTS, PREPARE FOR STATE 0
                89 ;************************************************
0057 3EEF       90 CNTR.   MVI    A,0EFH     ;CNTR 0 - LSB
0059 D30B       91         OUT    K11        ;MODE CONTOL REG
005B 3E13       92         MVI    A,13H
005D D303       93         OUT    K3         ;CLEAR INT7 (SMTR)
005F 3D         94         DCR    A
0060 D303       95         OUT    K3         ;CLEAR INT6 (120HZ)
0062 3D         96         DCR    A
0063 D303       97         OUT    K3         ;CLEAR INT5 (MMTR)
0065 3E1F       98         MVI    A,1FH      ;REMOVE ENABLES
0067 D303       99         OUT    K3
0069 2E60      100         MVI    L,60H      ;FWD CNTR - LSB
006B 3664      101         MVI    H,64H      ;100 - 1"
006D 2E63      102         MVI    L,63H      ;REV CNTR
006F 36FF      103         MVI    H,0FFH     ;MAX COUNT FOR HOME
0071 2C        104         INR    L          ;K6+64 - MAG STEP CNTR
0072 3604      105         MVI    H,4H       ;STARTUP VALUE
0074 2C        106         INR    L          ;K6+65 - MAG FUNC PENDING
```

```
LOC  OBJ        SEQ        SOURCE STATEMENT 0076 2E88       108            MVI     L,88H       ;MAG MULT FACTOR
0078 3600       109            MVI     H,00H       ;100% VALUE - 221 =0DDH
007A 2C         110            INR     L           ;K8+89 - DCR FACTOR FOR
007B 3600       111            MVI     H,00H       ;STARTUP RAMP
007D 2E30       112            MVI     L,30H       ;FUNCTION VALUE DISPLAY
007F 34         113            INR     H           ;SET - 1 - ACTIVE
0080 C3E00E     114            JMP     LAST2       ;WAIT FOR INT6
                115    ;
                116    ;++++++++++++++++++++++++++++++++++++++++++++
0083 3E15       117 INT7.      MVI     A,15H
0085 D303       118            OUT     K3          ;CLEAR INTERRUPT 7
0087 21413F     119            LXI     H,K8+41H    ;STATE ADDR.
008A 3E06       120            MVI     A,6H
008C BE         121            CMP     M           ;STATE - 6?
008D C2B601     122            JNZ     INT7N
0090 2E8D       123            MVI     L,8DH       ;RAMP STEP CNTR #1
0092 AF         124            XRA     A
0093 BE         125            CMP     M
0094 C27501     126            JNZ     INT7K
0097 2D         127            DCR     L           ;K8+8C - INT7 CNTR
0098 34         128            INR     M
0099 34         129            INR     M
009A 2E62       130            MVI     L,62H       ;#3 INPUT
009C 3E04       131            MVI     A,4H        ;LAMP LIMIT SW
009E A6         132            ANA     M
009F C29901     133            JNZ     INT7I
00A2 2C         134            INR     L           ;#4 INPUT
00A3 3E0B       135            MVI     A,0BH
00A5 D303       136            OUT     K3          ;#4 INPUT ENABLE
00A7 2E6A       137            MVI     L,6AH       ;SHTR CNT - RAW VALUE
00A9 DB01       138            IN      K4          ;INPUT SHTR COUNT
00AB 47         139            MOV     B,A         ;STORE IN B
00AC 2F         140            CMA
00AD 86         141            ADD     M           ;TWOS COMP. SUBTRACT
00AE 3C         142            INR     A
00AF 70         143            MOV     M,B         ;STORE NEW RAW VALUE
00B0 00         144            NOP
00B1 2E78       145            MVI     L,78H       ;SUBTRACTED SCANMOTOR COUNT
00B3 77         146            MOV     M,A
00B4 47         147            MOV     B,A
00B5 C3D600     148            JMP     INT7M       ;++++++++REMOVE FOR ICE65 SCAN DATA
00B8 2A903F     149            LHLD    K8+90H
00BB 3600       150            MVI     M,0H
00BD 23         151            INX     H
00BE 78         152            MOV     A,B
00BF 2F         153            CMA
00C0 77         154            MOV     M,A         ;STORE SHTR COUNT
00C1 23         155            INX     H
00C2 22903F     156            SHLD    K8+90H
00C5 217D3F     157            LXI     H,K8+7DH    ;COMPUTED STD SHTR COUNT
00C8 7E         158            MOV     A,M
00C9 2E49       159            MVI     L,49H       ;SHTR OUTPUT WORD
00CB 46         160            MOV     B,M
00CC 2A903F     161            LHLD    K8+90H
00CF 77         162            MOV     M,A
```

| LOC  | OBJ    | SEQ |        | SOURCE STATEMENT |                              |
|------|--------|-----|--------|------------------|------------------------------|
| 0000 | 23     | 163 |        | INX              | H                            |
| 0001 | 70     | 164 |        | MOV              | M,B                          |
| 0002 | 23     | 165 |        | INX              | H                            |
| 0003 | 22903F | 166 |        | SHLD             | K6+90H                       |
| 0006 | 21703F | 167 | INT7A. | LXI              | H,K6+70H ;STD CNT ADDR       |
| 0009 | 7E     | 168 |        | MOV              | A,M                          |
| 000A | 2E78   | 169 |        | MVI              | L,78H ;NEW SHTR COUNT        |
| 000C | 3C     | 170 |        | INR              | A ;TWOS COMPLEMENT SUBTRACT  |
| 000D | 86     | 171 |        | ADD              | M ;STD COUNT - NEW COUNT     |
| 000E | DA1601 | 172 |        | JC               | INT7A ;IF POSITIVE RESULT    |
| 00E1 | 1EFF   | 173 |        | MVI              | E,0FFH ;FF = NEG = SLOW      |
| 00E3 | 2F     | 174 |        | CMA              | ;CHANGE BACK FROM            |
| 00E4 | 3C     | 175 |        | INR              | A ;TWOS COMPLEMENT           |
| 00E5 | 57     | 176 | INT7B. | MOV              | D,A ;D1 IN D REG, SIGN IN E REG |
| 00E6 | 2E6C   | 177 |        | MVI              | L,6CH ;INT7 CNTR             |
| 00E8 | 7E     | 178 |        | MOV              | A,M                          |
| 00E9 | E606   | 179 |        | ANI              | 6H ;STRIP 6 BITS             |
| 00EB | C638   | 180 |        | ADI              | 38H ;BASE ADDR               |
| 00ED | 6F     | 181 |        | MOV              | L,A ;(N-4) ADDR              |
| 00EE | 4E     | 182 |        | MOV              | C,M ;SIGN TO C               |
| 00EF | 73     | 183 |        | MOV              | M,E ;NEW SIGN TO MEM         |
| 00F0 | 2C     | 184 |        | INR              | L                            |
| 00F1 | 46     | 185 |        | MOV              | B,M ;(N-4) DIFF TO B         |
| 00F2 | 72     | 186 |        | MOV              | M,D ;NEW DIFF TO MEM         |
| 00F3 | 97     | 187 |        | SUB              | A ;RESET CARRY               |
| 00F4 | 78     | 188 |        | MOV              | A,B                          |
| 00F5 | 3C     | 189 |        | INR              | A ;ROUND DAMPING FACTOR UP   |
| 00F6 | 1F     | 190 |        | RAR              | ;LAST DIFF./2                |
| 00F7 | 47     | 191 |        | MOV              | B,A ;IN B REG                |
| 00F8 | 79     | 192 |        | MOV              | A,C ;NOW DO .5D1 - .5(D2 - D1) |
| 00F9 | BB     | 193 |        | CMP              | E ; = D1 - .5D2              |
| 00FA | CA0601 | 194 |        | JZ               | INT7D ;SUBTRACT IF SIGNS ALIKE |
| 00FD | 78     | 195 |        | MOV              | A,B                          |
| 00FE | 82     | 196 |        | ADD              | D ;ADD IF SIGNS DIFFERENT    |
| 00FF | 57     | 197 |        | MOV              | D,A ;D1 - .5D2 IN D REG, +/- IN E |
| 0100 | DA1001 | 198 |        | JC               | INT7C ;OVERFLOW              |
| 0103 | C32001 | 199 |        | JMP              | INT7G                        |
| 0106 | 7A     | 200 | INT7D. | MOV              | A,D                          |
| 0107 | 90     | 201 |        | SUB              | B                            |
| 0108 | DA0F01 | 202 |        | JC               | INT7E ;BORROW OCCURRED       |
| 010B | 57     | 203 |        | MOV              | D,A                          |
| 010C | C32001 | 204 |        | JMP              | INT7G ;D1 - .5D2 IN D REG, +/- IN E |
| 010F | 2F     | 205 | INT7E. | CMA              |                              |
| 0110 | 3C     | 206 |        | INR              | A ;UNCOMPLEMENT RESULT       |
| 0111 | 57     | 207 |        | MOV              | D,A                          |
| 0112 | 7B     | 208 |        | MOV              | A,E                          |
| 0113 | 2F     | 209 |        | CMA              | ;CHANGE SIGN                 |
| 0114 | 5F     | 210 |        | MOV              | E,A                          |
| 0115 | C32001 | 211 |        | JMP              | INT7G                        |
| 0116 | 1E00   | 212 | INT7A. | MVI              | E,0H ;SIGN IS +              |
| 011A | C3E500 | 213 |        | JMP              | INT7B                        |
| 011D | 21493F | 214 | INT7C. | LXI              | H,K6+49H ;SHTR OUTPUT        |
| 0120 | 3EFF   | 215 |        | MVI              | A,0FFH                       |
| 0122 | BB     | 216 |        | CMP              | E                            |
| 0123 | 77     | 217 |        | MOV              | M,A                          |

```
LOC  OBJ         SEQ          SOURCE STATEMENT

0124 C2CE0E      218          JNZ    LAST      ;IF + (FAST)
0127 3601        219          MVI    M,1H      ;IF - (SLOW)
0129 C3CE0E      220          JMP    LAST
012C 97          221 INT7G.   SUB    A         ;RESET CARRY
012D 7A          222          MOV    A,D
012E 1F          223          RAR              ;CORRECTION /2
012F FE00        224          CPI    0H
0131 CACE0E      225          JZ     LAST      ;NO CHANGE
0134 57          226          MOV    D,A
0135 2E76        227          MVI    L,76H     ;#2 RAMP CNTR
0137 AF          228          XRA    A
0138 BE          229          CMP    M         ;- 0 ?
0139 CA5E01      230          JZ     INT7H
013C 3E04        231          MVI    A,4H
013E BA          232          CMP    D         ;CORRECTION > 4 ?
013F D26B01      233          JNC    INT7L     ;IF > 4
0142 3606        234          MVI    M,6H      ;END RAMP #2
0144 2E49        235 INT7O.   MVI    L,49H     ;SMTR OUTPUT
0146 57          236          MOV    D,A
0147 AF          237          XRA    A
0148 BB          238          CMP    E         ;SIGN - 0 ? (+, FAST)
0149 C25501      239          JNZ    INT7P     ;SUBTRACT IF -
014C 7E          240          MOV    A,M
014D 82          241          ADD    D         ;DECREASE SPEED
014E DA7C01      242          JC     INT7C
0151 77          243          MOV    M,A
0152 C37301      244          JMP    INT7K
0155 7E          245 INT7P.   MOV    A,M
0156 92          246          SUB    D         ;INCREASE SPEED
0157 DA7C01      247          JC     INT7C
015A 77          248          MOV    M,A
015B C37301      249          JMP    INT7K
015E 2E49        250 INT7H.   MVI    L,49H     ;SMTR OUTPUT
0160 AF          251          XRA    A
0161 BB          252          CMP    E         ;SIGN - +? (FAST?)
0162 C27101      253          JNZ    INT7J     ;FOR SUBTRACT IF -
0165 34          254          INR    M         ;DECREASE SPEED
0166 CA7C01      255          JZ     INT7C     ;IF OVERFLOW
0169 C37301      256          JMP    INT7K
016C 3E04        257 INT7L.   MVI    A,4H      ;MAX CORRECTION
016E C34401      258          JMP    INT7O
0171 35          259 INT7J.   DCR    M         ;INCREASE SPEED
0172 CA7C01      260          JZ     INT7C     ;IF BORROW
0175 2E49        261 INT7K.   MVI    L,49H     ;SMTR OUTPUT
0177 00          262          NOP              ;SAVE FOR MVI M ************
0178 00          263          NOP              ;************************
0179 3E7F        264          MVI    A,7FH     ;MIN SPEED
017B BE          265          CMP    M
017C D28001      266          JNC    INT7F
017F 77          267          MOV    M,A       ;STORE MIN SPEED
0180 7E          268 INT7F.   MOV    A,M
0181 D362        269          OUT    K6        ;OUTPUT NEW COMPUTED VAL
0183 77          270          MOV    M,A       ;STORE IN RAM
0184 3E10        271          MVI    A,10H     ;#2 ENABLE
0186 D363        272          OUT    K3
```

```
LOC  OBJ          SEQ          SOURCE STATEMENT

0165 C3CE0E      273               JMP   LAST
0168 2E74        274  INT7N:       MVI   L,74H      ;SHTR HOME DELAY
016D AF          275               XRA   A
016E BD          276               CMP   H
016F CA9901      277               JZ    INT7I
0192 25          278               DCR   H
0193 CA9901      279               JZ    INT7I
0196 C3CE0E      280               JMP   LAST
0199 2E49        281  INT7I:       MVI   L,49H      ;SHTR OFF
019B 36FF        282               MVI   H,0FFH
019D C3CE0E      283               JMP   LAST
                 284  ;++++++++++++++++++++++++++++++++++++++++++++++
                 285  ;     INTERRUPT #6 - FROM 120 HZ
                 286  ;++++++++++++++++++++++++++++++++++++++++++++++
01A0 3E14        287  INT6:        MVI   A,14H      ;CLEAR 120 HZ SIGNAL
01A2 D303        288               OUT   K3
01A4 3E0F        289               MVI   A,0FH      ;REMOVE ENABLE
01A6 D303        290               OUT   K3
01A8 2A6C3F      291               LHLD  K8+6CH     ;120HZ TIMER
01AB 2B          292               DCX   H
01AC 3E01        293               MVI   A,1H
01AE A5          294               ANA   L
01AF 3E04        295               MVI   A,4H       ;SET UP FOR 4 OR 8 ENABLE
01B1 5D          296               MOV   E,L
01B2 54          297               MOV   D,H
01B3 226C3F      298               SHLD  K8+6CH     ;DECREMENT & STORE IT
01B6 21403F      299               LXI   H,K8+40H   ;ENABLE COUNTER
01B9 CC07C2      300               CZ    INT6F
01BC 77          301               MOV   M,A        ;LOAD 4 OR 8
01BD 2E42        302               MVI   L,42H      ;400HZ COUNTER
01BF 3603        303               MVI   M,3H
01C1 AF          304               XRA   A
01C2 BA          305               CMP   D
01C3 C2CA01      306               JNZ   INT6A
01C6 BB          307               CMP   E
01C7 CAE601      308               JZ    INT6C      ;TIMEOUT
01CA 3E4E        309  INT6A:       MVI   A,K18
01CC D200        310               OUT   K18        ;STOP TIMER
01CE 3E18        311               MVI   A,18H      ;RESET INT1 & CLEAR MASK
01D0 30          312               DB    K20
01D1 3ECE        313  INT6E:       MVI   A,K17
01D3 D300        314               OUT   K14        ;START TIMER AFTER LOADING
01D5 3EF0        315               MVI   A,K15      ;80-10 CMD OR 80-04 LSB
01D7 D304        316               OUT   K11
01D9 3E00        317               MVI   A,K16      ;80-10 LSB OR 80-04 MIDE/MSB
01DB D303        318               OUT   K13        ;LOAD LSB TO CNTR
01DD C35503      319               JMP   STATE
01E0 21303F      320  INT6C:       LXI   H,K8+30H   ;FUNCTION DISP.
01E3 2E01        321               MVI   H,1H
01E5 2E41        322               MVI   L,41H      ;STATE #
01E7 BE          323               CMP   M          ;STATE - 0 ?
01E8 CAF601      324               JZ    INT6D
01EB 0606        325               MVI   B,6H       ;JAM CODE
01ED 3E02        326               MVI   A,2H
01EF BE          327               CMP   M          ;STATE - 2 ?
```

```
LOC  OBJ         SEQ          SOURCE STATEMENT

01F0 C2DF03      328              JNZ    JAM
01F3 2E61        329              MVI    L,61H      ;#2 INPUT
01F5 7E          330              MOV    A,M
01F6 E610        331              ANI    10H        ;STANDBY BYPASS SW
01F8 C20102      332              JNZ    INT6B      ;START 480HZ TIMER
01FB 2E77        333  INT6D.      MVI    L,77H      ;120HZ CNTR RESET REG
01FD BE          334              CMP    M          ;- 0 ?
01FE CAC002      335              JZ     INT6A      ;STANDBY
0201 CD930B      336  INT6B.      CALL   FUNC       ;ACTIVATE FUNC VAL DISP
0204 C3C801      337              JMP    INT6A      ;START 480HZ TIMER
0207 87          338  INT6F.      ADD    A          ;2 X 4 = 8 (ENABLE)
0208 C9          339              RET
                 340  ;************************************************
                 341  ;      INTERRUPT #3 - FROM MMTR
                 342  ;************************************************
0209 3E13        343  INT3.       MVI    A,13H      ;CLEAR INT3
020B D303        344              OUT    K3
020D 216E3F      345              LXI    H,K8+6EH   ;MMTR CNTR - LSB
0210 AF          346              XRA    A
0211 BE          347              CMP    M
0212 C21C02      348              JNZ    INT3A
0215 2C          349              INR    L
0216 BE          350              CMP    M
0217 CA2602      351              JZ     INT3E
021A 35          352              DCR    M
021B 2D          353              DCR    L
021C 35          354  INT3A.      DCR    M
021D C22602      355              JNZ    INT3E
0220 2C          356              INR    L
0221 AF          357              XRA    A
0222 BE          358              CMP    M
0223 CA6702      359              JZ     INT3D      ;MMTR "TIMEOUT"
0226 2E41        360  INT3E.      MVI    L,41H      ;STATE ADDR
0228 3E06        361              MVI    A,6H
022A BE          362              CMP    M
022B CA3A02      363              JZ     INT3Z      ;COMPUTE STD SMTR COUNT
022E 3E08        364              MVI    A,8H
0230 BE          365              CMP    M
0231 C2E60E      366              JNZ    LAST       ;IF STATE NOT = 8
0234 2E63        367              MVI    L,63H      ;EXIT LENGTH MEASURE
0236 34          368              INR    M
0237 C3E60E      369              JMP    LAST
023A 2E6B        370  INT3Z.      MVI    L,6BH      ;MMTR COUNT - RAW VALUE
023C 3E0A        371              MVI    A,0AH      ;#3 INPUT
023E D303        372              OUT    K3
0240 DB01        373              IN     K4
0242 2F          374              CMA
0243 47          375              MOV    B,A        ;STORE RAW VALUE IN B
0244 2F          376              CMA
0245 86          377              ADD    M          ;TWOS COMP. SUBTRACT
0246 3C          378              INR    A
0247 70          379              MOV    M,B
0248 2E79        380              MVI    L,79H
024A FE08        381              CPI    08H        ;ANTI NOISE FILTER
024C D2E60E      382              JNC    LAST
```

```
LOC   OBJ        SEQ           SOURCE STATEMENT

024F  FEB8       363           CPI    0B8H       ;NOMINAL VALUE - B8
0251  DACE0E     364           JC     LAST
0254  77         365           MOV    M,A
0255  00         366           NOP               ;SAVE FOR MVI M ++++++++++++++
0256  00         367           NOP               ;+++++++++++++++++++++++++++
0257  5F         368           MOV    E,A
0258  2E88       369           MVI    L,88H      ;MAGIC FACTOR ADDR.
025A  7E         370           MOV    A,M
025B  CDA90E     371           CALL   MULT       ;D&E -A + E
025E  21703F     372           LXI    H,K8+70H   ;STD SHTR COUNT
0261  00         373           NOP               ;SAVE FOR MVI D ++++++++
0262  00         374           NOP               ;+++++++++++++++++++++
0263  72         375           MOV    M,D
0264  C3CE0E     376           JMP    LAST
0267  21413F     397 INT3D:    LXI    H,K8+41H   ;STATE #
026A  3E04       398           MVI    A,4H
026C  BE         399           CMP    M          ;STATE - 4
026D  CACE0E     400           JZ     LAST       ;+++++++++TEMP FROM JZ - INT3A
0270  0603       401           MVI    B,3H       ;JAM CODE
0272  3E06       402           MVI    A,6H
0274  BE         403           CMP    M          ;STATE - 6?
0275  C23F03     404           JNZ    JAM
0278  05         405           DCR    B          ;JAM CODE - 4
0279  2E62       406           MVI    L,62H      ;#3 INPUT
027B  7E         407           MOV    A,M
027C  E604       408           ANI    4H
027E  CA3F03     409           JZ     JAM        ;IF S-16 NOT ACTIVE
0281  2E60       410           MVI    L,60H      ;#1 INPUT
0283  3E02       411           MVI    A,2H       ;MIDDLE SW (S-20)
0285  47         412           MOV    B,A        ;JAM CODE - 2
0286  A6         413           ANA    M
0287  CA3F03     414           JZ     JAM        ;IF S-20 NOT ACTIVE
028A  2E4A       415           MVI    L,4AH      ;#3 OUTPUT
028C  3EDE       416           MVI    A,0DEH     ;CYCLE CNTR , SCAN RETURN ON
028E  A6         417           ANA    M
028F  77         418           MOV    M,A
0290  2E62       419           MVI    L,62H      ;#3 INPUT
0292  7E         420           MOV    A,M
0293  E608       421           ANI    8H         ;PMVG SIGNAL
0295  2E31       422           MVI    L,31H      ;PMVG STORAGE
0297  77         423           MOV    M,A
0298  2C         424           INR    L          ;K8+32 - PMVG COUNT
0299  360A       425           MVI    M,0AH      ;90/60 SEC ,PMVG DELAY AFTER STATE 7
029B  2E41       426           MVI    L,41H
029D  3607       427           MVI    M,7H       ;CHANGE TO STATE 7
029F  21FF00     428           LXI    H,0FFH     ;2 SEC TILL PMVG +++TEST+++
02A2  226C3F     429           SHLD   K8+6CH     ;120 HZ TIMER
02A5  C3CE0E     430           JMP    LAST
                 431 ;+++++++++++++++++++++++++++++++++++++++++++++
                 432 ;       INTERRUPT #1 - FROM CNTR - 480HZ
                 433 ;+++++++++++++++++++++++++++++++++++++++++++++
02A8  F3         434 INT1:     DI
02A9  3E4E       435           MVI    A,K18
02AB  D308       436           OUT    K18        ;STOP TIMER
02AD  3E18       437           MVI    A,18H
```

```
LOC  OBJ         SEQ         SOURCE STATEMENT

02AF 36          438         DB      K28     ;CLEAR MASK & RESET INT1
02B0 21403F      439         LXI     H,K8+40H ;ENABLE CNTR
02B3 35          440         DCR     M
02B4 CAC002      441         JZ      INT1A
02B7 2E42        442         MVI     L,42H   ;480 HZ CNTR
02B9 35          443         DCR     M       ;DECREMENT IT
02BA CA6003      444         JZ      STATE   ;DETERMINE STATUS
02BD C3D101      445         JMP     INT6E   ;LOAD COUNTER
02C0 3601        446 INT1A.  MVI     M,1H    ;RESET ENABLE STRUCTURE
02C2 C3CE0E      447         JMP     LAST
                 448 ;************************************************
                 449 ;      INTERRUPT #6 - FROM JAM
                 450 ;************************************************
02C5 3E16        451 INT6A.  MVI     A,16H   ;MASTER CLEAR
02C7 D303        452         OUT     K3
02C9 CDD202      453         CALL    INT6B
02CC CD930B      454         CALL    FUNC    ;ACTIVATE FUNC VAL DISP
02CF C3CE0E      455         JMP     LAST
02D2 21403F      456 INT6B.  LXI     H,K8+40H ;PRESERVE STEPPER OUTPUT
02D5 7E          457         MOV     A,M
02D6 F60F        458         ORI     0FH     ;LOWER 4 BITS OFF
02D8 2E70        459         MVI     L,70H   ;TEMP. STORAGE
02DA 77          460         MOV     M,A
02DB CD2608      461         CALL    RAM3    ;ALL OFF VALUES
02DE 21413F      462         LXI     H,K8+41H
02E1 3600        463         MVI     M,0H    ;STATE - 0 (STANDBY)
02E3 2E70        464         MVI     L,70H   ;TEMP. STEPPER STORAGE
02E5 7E          465         MOV     A,M
02E6 2E40        466         MVI     L,40H   ;#6 OUTPUT
02E8 77          467         MOV     M,A
02E9 D306        468         OUT     K6
02EB 3E19        469         MVI     A,19H   ;#6 OUTPUT ENABLE
02ED D303        470         OUT     K3
02EF 3E0F        471         MVI     A,0FH
02F1 D303        472         OUT     K3      ;REMOVE ENABLE
02F3 2E43        473         MVI     L,43H   ;STATUS
02F5 C9          474         RET
                 475 ;************************************************
                 476 ;      DRUM AND SCANNER IN HOME POSITION ?
                 477 ;************************************************
02F6 21623F      478 HOME.   LXI     H,K8+62H ;#3 OF INPUT
02F9 56          479         MOV     D,M
02FA 2E74        480         MVI     L,74H   ;SNTR HOME DELAY
02FC 3E02        481         MVI     A,2H    ;LAMP HOME SW  5-15
02FE A2          482         ANA     D
02FF C20603      483         JNZ     HOME6   ;IF NOT HOME
0302 BE          484         CMP     M       ;- 0 ?
0303 CA1303      485         JZ      HOME5
0306 3E02        486         MVI     A,2H
0308 B2          487         ORA     D       ;DELAY HOME SW SIGNAL
0309 57          488         MOV     D,A
030A C31303      489         JMP     HOME5
030D 3624        490 HOME6.  MVI     M,24H   ;36 INT7 COUNTS - 1 1/4"
030F 2E76        491         MVI     L,76H   ;120HZ TIMEOUT
0311 3628        492         MVI     M,28H   ;1/3 SEC.
```

```
LOC   OBJ        SEQ         SOURCE STATEMENT 0313 2E43        493 HOME5.  MVI    L,43H        ;STATUS
0315 3E03        494         MVI    A,3H         ;DRUM HOME SW, LAMP HOME SW
0317 A2          495         ANA    D
0318 CA4803      496         JZ     HOME1        ;IF BOTH IN HOME POSITION
031B 3E10        497         MVI    A,10H        ;SET #4 BIT = 1
031D B6          498         ORA    M
031E 77          499         MOV    M,A          ;STATUS - NOT HOME
031F 2E4A        500         MVI    L,4AH        ;#3 GP OUTPUT
0321 3E01        501         MVI    A,1H         ;DRUM HOME SW
0323 A2          502         ANA    D
0324 CA3603      503         JZ     HOME2        ;IF DRUM HOME
0327 3EE7        504         MVI    A,0E7H       ;MNTR AND DRUM ACTIVE
0329 A6          505         ANA    M            ;ON NEXT OUTPUT
032A 77          506         MOV    M,A
032B 3E02        507 HOME3:  MVI    A,2H         ;LAMP HOME SW
032D A2          508         ANA    D
032E CA4303      509         JZ     HOME4        ;IF LAMP HOME
0331 3EDF        510 HOME7:  MVI    A,0DFH       ;RETURN ACTIVE
0333 A6          511         ANA    M            ;ON NEXT OUTPUT
0334 77          512         MOV    M,A
0335 C9          513         RET
0336 3E08        514 HOME2:  MVI    A,08H        ;DEACTIVATE DRUM DRIVE & HVP
0338 B6          515         ORA    M            ;ON NEXT OUTPUT
0339 77          516         MOV    M,A
033A 2C          517         INR    L            ;#4 OUTPUT (EXP.,DEV,.....)
033B 3E1F        518         MVI    A,1FH        ;OFF VALUES TO RAM
033D B6          519         ORA    M
033E 77          520         MOV    M,A
033F 2D          521         DCR    L            ;#3 OUTPUT
0340 C32B03      522         JMP    HOME3
0343 3E20        523 HOME4:  MVI    A,20H        ;DEACTIVATE RETURN
0345 B6          524         ORA    M            ;ON NEXT OUTPUT
0346 77          525         MOV    M,A
0347 C9          526         RET
0348 3EEF        527 HOME1.  MVI    A,0EFH
034A A6          528         ANA    M            ;STATUS REGISTER (K8+43)
034B 77          529         MOV    M,A          ;RESET #4 BIT = 0
034C 2E4A        530         MVI    L,4AH        ;#3 GP OUTPUT
034E 3E78        531         MVI    A,78H
0350 B6          532         ORA    M            ;DRUM,LAMP RETURN, HVP OFF
0351 77          533         MOV    M,A          ;ON NEXT OUTPUT
0352 C9          534         RET
                 535 ;************************************************
                 536 ;       PAPER PATH CLEAR ?
                 537 ;************************************************
0353 21603F      538 PATH.   LXI    H,K8+60H     ;#1 GP INPUT
0356 7E          539         MOV    A,M
0357 0601        540         MVI    B,1H         ;JAM CODE
0359 E6F2        541         ANI    0F2H         ;PATH CLEAR ?
035B C25F03      542         JNZ    JAM          ;IF NOT
035E C9          543         RET                 ;END OF SUBR.
                 544 ;************************************************
                 545 ;       JAM SUBROUTINE
                 546 ;************************************************
035F 21583F      547 JAM.    LXI    H,K8+58H     ;#1 DISP
```

```
LOC  OBJ         SEQ         SOURCE STATEMENT 0362 78          548          MOV    A,B       ;JAM CODE TO #1 DISP
0363 2E41        549          MVI    L,41H     ;STATE CNTR
0365 7E          550          MOV    A,M
0366 2E09        551          MVI    L,09H     ;#2 DISP
0368 77          552          MOV    M,A
0369 2C          553          INR    L         ;#3 DISP ADDR.
036A 3611        554          MVI    M,11H     ;" - "
036C 2C          555          INR    L         ;#4 DISP ADDR.
036D 3610        556          MVI    M,10H     ;" E "
036F 2E43        557          MVI    L,43H     ;STATUS WORD ADDR.
0371 7E          558          MOV    A,M
0372 F680        559          ORI    80H       ;SET JAM BIT
0374 77          560          MOV    M,A
0375 2E33        561          MVI    L,33H     ;CLEAR DECIMAL POINT
0377 3600        562          MVI    M,0H
0379 2E77        563          MVI    L,77H     ;120HZ RESET REG
037B 36FF        564          MVI    M,0FFH    ;HOLD OUT CLEAR "FOREVER"
037D C30C02      565          JMP    INT0A
                 566  ;************************************************
                 567  ;      DETERMINE PROGRAM STATE
                 568  ;************************************************
                 569  ;
0380 21413F      570  STATE:  LXI    H,K0+41H  ;STATE ADDR.
0383 7E          571          MOV    A,M       ;GET STATE #
0384 0610        572          MVI    B,10H     ;"E" - JAM CODE
0386 FE09        573          CPI    9H        ;MAX VALUE - 8
0388 D20F03      574          JNC    JAM       ;BAD STATE VALUE
038B 87          575          ADD    A         ;X 2
038C 219903      576          LXI    H,TBL0    ;LOOK UP TABLE FOR STATE
038F 85          577          ADD    L
0390 DCA603      578          CC     STAT1
0393 6F          579          MOV    L,A
0394 5E          580          MOV    E,M
0395 23          581          INX    H
0396 56          582          MOV    D,M
0397 EB          583          XCHG
0398 E9          584          PCHL             ;JUMP TO STATE
0399 A003        585  TBL0:   DW     ST0
039B 8D04        586          DW     ST1
039D 0F05        587          DW     ST2
039F 8605        588          DW     ST3
03A1 9106        589          DW     ST4
03A3 9707        590          DW     ST5
03A5 6F08        591          DW     ST6
03A7 C708        592          DW     ST7
03A9 4709        593          DW     ST8
03AB 24         594  STAT1:   INR    H
03AC C9          595          RET
                 596  ;************************************************
                 597  ;      STATE 0 - STANDBY
                 598  ;************************************************
                 599  ;      DCR CNTR IN C REG
03AD 21433F      600  ST0:    LXI    H,K0+43H  ;STATUS WORD
03B0 3E80        601          MVI    A,80H
03B2 A6          602          ANA    M         ;CHECK JAM BIT
```

```
LOC  OBJ      SEQ         SOURCE STATEMENT

03B3 CAE003   603             JZ    ST0A    ;IF CLEAR
03B6 2E4C     604             MVI   L,4CH   ;#5 OUTPUT
03B8 36FD     605             MVI   M,0FDH  ;ERROR LAMP ON
03BA CDA709   606             CALL  DISP
03BD 3E03     607             MVI   A,3H
03BF B9       608             CMP   C       ;#3 ENABLE ?
03C0 C2D003   609             JNZ   ST0D
03C3 3C       610             INR   A
03C4 BE       611             CMP   M       ;CLEAR BUTTON PRESSED ?
03C5 C2D003   612             JNZ   ST0D
03C8 2E09     613             MVI   L,09H   ;#2 DISP
03CA 3E06     614             MVI   A,6H
03CC BE       615             CMP   M       ;STATE OF JAM > 6 ?
03CD D2D003   616             JNC   ST0E    ;CLEAR JAM
03D0 2E61     617 ST0D.       MVI   L,61H   ;#2 INPUT
03D2 3E20     618             MVI   A,20H   ;ERROR RESET SW
03D4 A6       619             ANA   M
03D5 CAE603   620             JZ    ST0B
03D8 2E43     621 ST0E.       MVI   L,43H   ;STATUS
03DA 3640     622             MVI   H,40H   ;CLEAR JAM, SET WARMUP BIT
03DC 2E52     623             MVI   L,52H   ;#3 KB WORD
03DE 3604     624             MVI   H,4H    ;CLEAR BUTTON
03E0 CD7706   625             CALL  CLR1    ;CLEAR DISP
03E3 CD330B   626             CALL  FUNC    ;ACTIVATE FUNC VAL DISP
03E6 CD9F0A   627 ST0B:       CALL  GPIO
03E9 C3CE0E   628             JMP   LAST
03EC CD170E   629 ST0A.       CALL  DIAG
03EF CD990A   630             CALL  KB
03F2 CDFE0C   631             CALL  MAGA
03F5 CD3304   632             CALL  ST0C
03F8 2E4C     633             MVI   L,4CH   ;#5 OUTPUT
03FA 3EFB     634             MVI   A,0FBH  ;STANDBY LAMP ON
03FC A6       635             ANA   M
03FD F61A     636             ORI   1AH     ;WARMUP,CYCLE,READY OFF
03FF 77       637             MOV   M,A
0400 2E52     638             MVI   L,52H   ;#3KB WORD
0402 3E08     639             MVI   A,8H
0404 A6       640             ANA   M       ;CHECK FOR START KEY
0405 CACE0E   641             JZ    LAST
0408 CD3303   642             CALL  PATH
040B 2E48     643             MVI   L,48H   ;#1 OUTPUT
040D 367F     644             MVI   H,7FH   ;A C POWER ON
040F 2E4C     645             MVI   L,4CH   ;#5 OUTPUT
0411 3EF7     646             MVI   A,0F7H  ;WARMUP LAMP ON
0413 A6       647             ANA   M
0414 F616     648             ORI   16H     ;STANDBY, READY, CYCLE OFF
0416 77       649             MOV   M,A
0417 2E43     650             MVI   L,43H   ;STATUS REG
0419 3E40     651             MVI   A,40H
041B B6       652             ORA   M       ;SET WARMUP BIT
041C 77       653             MOV   M,A
041D 2E41     654             MVI   L,41H
041F 3601     655             MVI   M,1H    ;CHANGE STATE - 1
0421 CD330B   656             CALL  FUNC    ;ACTIVATE FUNC VAL DISP
0424 216054   657             LXI   H,5460H ;3 MIN. WARMUP MAX
```

```
LOC   OBJ        SEQ        SOURCE STATEMENT 0427  2260CF     658                SHLD    K8+6CH   ;120 HZ TIMER
042A  214401     659                LXI     H,144H   ;MAX COUNT FOR HOME SUBR.
042D  226E3F     660                SHLD    K8+6EH
0430  C3CE0E     661                JMP     LAST
0433  2130CF     662 ST6C.          LXI     H,K8+30H ;FUNCTION DISPLAY
0436  AF         663                XRA     A
0437  BE         664                CMP     M
0438  C8         665                RZ
0439  2E43       666                MVI     L,43H    ;STATUS
043B  7E         667                MOV     A,M
043C  E688       668                ANI     88H      ;JAM OR FUNCTION PENDING
043E  C0         669                RNZ
043F  2E77       670                MVI     L,77H    ;120HZ RESET
0441  AF         671                XRA     A
0442  BE         672                CMP     M
0443  C0         673                RNZ
0444  2E6C       674                MVI     L,6CH    ;120HZ CNTR - LSB
0446  BE         675                CMP     M        ; - 0 ?
0447  C0         676                RNZ
0448  2E3E       677                MVI     L,3EH    ;#7 DISP
044A  3E0D       678                MVI     A,0DH    ;F. ?
044C  BE         679                CMP     M
044D  C8         680                RZ
044E  CD0008     681                CALL    CLR
0451  CD930B     682                CALL    FUNC     ;KEEP FUNC DISP ACTIVE
0454  2E6D       683                MVI     L,6DH    ;120HZ CNTR - MSB
0456  3E03       684                MVI     A,3H
0458  A6         685                ANA     M        ;STRIP OFF 6
0459  FE00       686                CPI     0H
045B  CABF08     687                JZ      MAG
045E  FE03       688                CPI     3H
0460  CAD108     689                JZ      MAR
0463  FE02       690                CPI     2H
0465  CAE008     691                JZ      LEN
0468  C38208     692                JMP     SPL
046B  2140CF     693 VAC1.          LXI     H,K8+40H ;#6 OUTPUT
046E  3EFE       694                MVI     A,0FEH   ;VACSOL ON (FUSER VACUUM)
0470  A6         695                ANA     M
0471  77         696                MOV     M,A
0472  2E4B       697                MVI     L,4BH    ;#4 OUTPUT
0474  3E0D       698                MVI     A,0DH    ;LAMP, RED ELI, DEV OFF
0476  B6         699                ORA     M
0477  77         700                MOV     M,A
0478  C9         701                RET
0479  2E40       702 VAC2.          MVI     L,40H    ;#6 OUTPUT
047B  3E01       703                MVI     A,1H     ;VACSOL OFF (NO FUSER VACUUM)
047D  B6         704                ORA     M
047E  77         705                MOV     M,A
047F  C9         706                RET
                 707 ;************************************************
                 708 ;    STATE 1 - WARMUP
                 709 ;************************************************
                 710 ;
0480  CD6904     711 ST1.           CALL    ST12
0483  CD1508     712                CALL    ST2A     ;CHECK STATUS
```

| LOC OBJ | SEQ | | SOURCE STATEMENT | | |
|---|---|---|---|---|---|
| 0486 C3C604 | 713 | | JMP | ST1D | |
| 0489 2148JF | 714 ST1Z: | LXI | H,K8+48H | |
| 048C 3E03 | 715 | | MVI | A,3H | ;CHECK IF DCR CNTR = 8 OR 4 |
| 048E A6 | 716 | | ANA | M | |
| 048F CAA404 | 717 | | JZ | ST1A | |
| 0492 CD500D | 718 | | CALL | FUSER | |
| 0495 CDA709 | 719 | | CALL | DISP | ;OUTPUT TO DISPLAY |
| 0498 CD0303 | 720 | | CALL | PATH | |
| 049B CDF602 | 721 | | CALL | HOME | |
| 049E CDFE0C | 722 | | CALL | MAGA | |
| 04A1 C3C204 | 723 | | JMP | ST1B | |
| 04A4 CDF904 | 724 ST1A: | CALL | ST1C | |
| 04A7 CD170E | 725 | | CALL | DIAG | |
| 04AA 21523F | 726 | | LXI | H,K8+52H | ;#3 KB WORD |
| 04AD 3E08 | 727 | | MVI | A,8H | ;START KEY |
| 04AF A6 | 728 | | ANA | M | |
| 04B0 CABF04 | 729 | | JZ | ST1G | |
| 04B3 2E41 | 730 | | MVI | L,41H | ;CHECK FOR STATE 1 |
| 04B5 3E01 | 731 | | MVI | A,1H | |
| 04B7 BE | 732 | | CMP | M | |
| 04B8 C2BF04 | 733 | | JNZ | ST1G | |
| 04BB 2E30 | 734 | | MVI | L,30H | ;FUNCTION VALUE DISPLAY |
| 04BD 3601 | 735 | | MVI | M,1H | ;SET ACTIVE |
| 04BF CD3304 | 736 ST1G: | CALL | ST0C | ;FUNCTION VALUE DISPLAY |
| 04C2 CD990A | 737 ST1B: | CALL | KB | ;INSPECT KEYBOARD & GP INPUTS |
| 04C5 C9 | 738 | | RET | | |
| 04C6 21523F | 739 ST1D: | LXI | H,K8+52H | ;#3 KB WORD |
| 04C9 3E08 | 740 | | MVI | A,8H | ;START KEY |
| 04CB A6 | 741 | | ANA | M | |
| 04CC C2CE0E | 742 | | JNZ | LAST | ;IF DEPRESSED |
| 04CF 2E41 | 743 ST1F: | MVI | L,41H | ;STATE = 1 ? |
| 04D1 3E01 | 744 | | MVI | A,1H | |
| 04D3 BE | 745 | | CMP | M | |
| 04D4 CC000B | 746 | | CZ | CLR | |
| 04D7 CD0202 | 747 | | CALL | INT0B | ;RESET RAM, PRESERVE STEPPER |
| 04DA 2E48 | 748 | | MVI | L,48H | ;#1 OUTPUT |
| 04DC 367F | 749 | | MVI | M,7FH | ;AC POWER ON |
| 04DE 2E41 | 750 | | MVI | L,41H | |
| 04E0 3602 | 751 | | MVI | M,2H | ;CHANGE STATE = 2 |
| 04E2 2E77 | 752 | | MVI | L,77H | ;RESET REG ADDR. |
| 04E4 3601 | 753 | | MVI | M,1H | ;9 MIN TILL STANDBY |
| 04E6 2E30 | 754 | | MVI | L,30H | ;FUNCTION DISPLAY |
| 04E8 3600 | 755 | | MVI | M,0H | ;SET INACTIVE |
| 04EA 21000A | 756 | | LXI | H,0A00H | ;22 SEC TILL FUNC DISP |
| 04ED 226C3F | 757 | | SHLD | K8+6CH | ;120 HZ TIMER |
| 04F0 214401 | 758 | | LXI | H,144H | ;MAX COUNT FOR HOME SUBR. |
| 04F3 226E3F | 759 | | SHLD | K8+6EH | ;MMTR CNTR |
| 04F6 C3CE0E | 760 | | JMP | LAST | |
| 04F9 21763F | 761 ST1C: | LXI | H,K8+76H | ;SMTR HOME TIMEOUT |
| 04FC AF | 762 | | XRA | A | |
| 04FD BE | 763 | | CMP | M | ;=0? |
| 04FE CA0605 | 764 | | JZ | ST1E | ;CHECK INT7 CNTR |
| 0501 35 | 765 | | DCR | M | |
| 0502 CA0605 | 766 | | JZ | ST1E | ;CHECK INT7 CNTR |
| 0505 C9 | 767 | | RET | | |

```
LOC  OBJ        SEQ        SOURCE STATEMENT 0006 2E74       768 ST1E.  MVI    L,74H    ;INT7 CNTR
0008 0607       769        MVI    B,7H     ;JAM CODE
000A BE         770        CMP    M
000B C25F03     771        JNZ    JAM      ;NO INT7
000E C9         772        RET
                773 ;***************************************************
                774 ;      STATE 2 - READY
                775 ;***************************************************
000F CD6904     776 ST2.   CALL   ST1Z     ;SAME SUBROUTINES AS STATE 1
0012 C33B05     777        JMP    ST2H
0015 21433F     778 ST2A.  LXI    H,K8+43H ,STATUS
0018 3EF8       779        MVI    A,0F8H   ,CHECK 5 BITS
001A A6         780        ANA    M
001B 47         781        MOV    B,A
001C C2CE0E     782        JNZ    LAST     ,IF BIT SET
001F C9         783        RET
0020 3E0D       784 ST2G.  MVI    A,0DH    , F. ?
0022 BE         785        CMP    M
0023 CA6305     786        JZ     ST2L
0026 46         787 ST2K.  MOV    B,M      ,LOWER DISP TO B
0027 7D         788        MOV    A,L
0028 D604       789        SUI    4H
002A 6F         790        MOV    L,A      ,UPPER DISP ADDR
002B 7E         791        MOV    A,M
002C B8         792        CMP    B
002D C46604     793        CNZ    VAC1     ,IF DISP DIFFERENT
0030 2E48       794 ST2B.  MVI    L,48H    ,#4 OUTPUT
0032 3E3F       795        MVI    A,3FH    ,COUNT, QUAN LAMPS ON
0034 A6         796        ANA    M
0035 77         797        MOV    M,A
0036 3EFF       798        MVI    A,0FFH   ,ALL OFF - #5 OUTPUT
0038 C37405     799        JMP    ST2M
003B 21803F     800 ST2H.  LXI    H,K8+80H ,HAG FUNC PENDING
003E 3E01       801        MVI    A,1H
0040 BE         802        CMP    M
0041 2E4C       803        MVI    L,4CH    ,#5 OUTPUT
0043 CA4E05     804        JZ     ST2N
0046 3EEF       805        MVI    A,0EFH   ,READY LAMP ON
0048 A6         806        ANA    M
0049 F60E       807        ORI    0EH      ,STANDBY, CYCLE, WARMUP OFF
004B C35105     808        JMP    ST2P
004E 3E1E       809 ST2N.  MVI    A,1EH    ,READY, STANDBY, CYCLE,
0050 B6         810        ORA    M        ,WARMUP OFF
0051 77         811 ST2P.  MOV    M,A
0052 2E5C       812        MVI    L,5CH    ,#5 DISP VAL
0054 AF         813        XRA    A
0055 BE         814        CMP    M        ,(REG A-0)
0056 C22605     815        JNZ    ST2K
0059 2C         816        INR    L        ,#6 DISP
005A BE         817        CMP    M
005B C22605     818        JNZ    ST2K
005E 2C         819        INR    L        ,#7 DISP
005F BE         820        CMP    M
0060 C22005     821        JNZ    ST2G
0063 CD1505     822 ST2L.  CALL   ST2A     ,CHECK STATUS
```

```
LOC  OBJ      SEQ         SOURCE STATEMENT 0066 2E02     823         MVI    L,02H       ;#3 KB WORD
0068 3E08     824         MVI    A,8H        ;START KEY ?
006A A6       825         ANA    M
006B CACE0E   826         JZ     LAST
006E 2E0C     827         MVI    L,0CH       ;#3 DISPLAY
0070 34       828         INR    M           ;COUNT - 1
0071 033085   829         JMP    ST2B
0074 2C       830 ST2M:   INR    L           ;#3 OUTPUT
0075 F61C     831         ORI    1CH         ;READY,WARMUP,STANDBY OFF
0077 77       832         MOV    M,A
0078 CD1585   833         CALL   ST2A        ;CHECK STATUS
007B 2E61     834         MVI    L,61H       ;#2 INPUT
007D 3E40     835         MVI    A,40H       ;UTILITY INPUT (S-30)
007F A6       836         ANA    M
0080 CA6D85   837         JZ     ST2Q
0083 2E6D     838         MVI    L,6DH       ;120HZ CNTR - MSB
0085 3E06     839         MVI    A,6H        ;RE: 22SEC FUNC DISPLAY, ST1F
0087 BE       840         CMP    M           ;6.6 SEC DELAY FOR CUST SIM
0088 DACE0E   841         JC     LAST
008B 263F     842         MVI    H,K7
008D 2E4A     843 ST2Q.   MVI    L,4AH       ;#3 OUTPUT
008F 3E77     844         MVI    A,77H       ;MOT, EMC-2 ON
0091 A6       845         ANA    M
0092 77       846         MOV    M,A
0093 2E77     847         MVI    L,77H       ;ZERO TIMER RESET REG.
0095 3600     848         MVI    M,0H
0097 216700   849         LXI    H,67H       ;MARGIN ADVANCE
009A 22713F   850         SHLD   K8+71H      ;1" (480 HZ)
009D 210000   851         LXI    H,0H        ;SET MMTR CNTR FOR NO INT
00A0 226E3F   852         SHLD   K8+6EH      ;UNTIL AFTER DEV OFF SW
00A3 21683F   853         LXI    H,K8+68H    ;LENGTH REG.
00A6 AF       854         XRA    A
00A7 77       855         MOV    M,A         ;RESET
00A8 2E60     856         MVI    L,60H       ;#1 INPUT
00AA 3E08     857         MVI    A,8H        ;#3 BIT - MANUAL SW
00AC A6       858         ANA    M
00AD CABC05   859         JZ     ST2C
00B0 3E02     860         MVI    A,2H
00B2 4F       861         MOV    C,A
00B3 2E43     862         MVI    L,43H
00B5 B0       863         ORA    B
00B6 F608     864         ORI    8H          ;SET FUNC PENDING BIT
00B8 77       865         MOV    M,A
00B9 C3E705   866         JMP    ST2D        ;MANUAL FEED
00BC 2E6A     867 ST2C.   MVI    L,6AH       ;SUPPLY SELECT
00BE 7E       868         MOV    A,M         ;0 - ROLL, 1 - CASSETTE
00BF 4F       869         MOV    C,A         ;STORE IN C
00C0 B0       870         ORA    B           ;RESET STATUS WORD
00C1 2E43     871         MVI    L,43H
00C3 F608     872         ORI    8H          ;SET FUNC. PENDING BIT
00C5 77       873         MOV    M,A
00C6 2E41     874         MVI    L,41H
00C8 3603     875         MVI    M,3H        ;CHANGE STATE - 3
00CA AF       876         XRA    A
00CB B9       877         CMP    C           ;SUPPLY SELECT BIT
```

```
LOC  OBJ        SEQ         SOURCE STATEMENT

05CC CAD605     878         JZ      ST2E    ;ROLL FEED (-8)
05CF 2E48       879         MVI     L,48H   ;#4 OUTPUT
05D1 3EFD       880         MVI     A,0FDH  ;SOL 4 ON
05D3 A6         881         ANA     M
05D4 77         882         MOV     M,A
05D5 C3FF05     883         JMP     ST2F    ;SET 1.5 SEC DELAY TO S-23
05D8 2E48       884 ST2E.   MVI     L,48H   ;#1 OUTPUT
05DA 3EE7       885         MVI     A,0E7H  ;ROLL FEED MOTOR,CLUTCH ON
05DC A6         886         ANA     M
05DD 77         887         MOV     M,A
05DE 216801     888         LXI     H,168H  ;3 SEC DELAY ++++++++TEST
05E1 226C3F     889         SHLD    K6+6CH  ;120 HZ TIMER
05E4 C3CE0E     890         JMP     LAST
05E7 2E88       891 ST2D.   MVI     L,88H   ;MAG MULT FACTOR
05E9 4E         892         MOV     C,M     ;STORE IN C
05EA 2E48       893         MVI     L,48H   ;#4 OUTPUT
05EC 3EB3       894         MVI     A,0B3H  ;66% MAG MULT VALUE
05EE 91         895         SUB     C
05EF DAF705     896         JC      ST2I    ;IF > 66%
05F2 3EF6       897         MVI     A,0F6H  ;LAP ON, RED. ELI. ON
05F4 C3F905     898         JMP     ST2J
05F7 3EFE       899 ST2I.   MVI     A,0FEH  ;LAMP RELAY ON (LAP)
05F9 A6         900 ST2J:   ANA     M
05FA 77         901         MOV     M,A
05FB 2E41       902         MVI     L,41H
05FD 3604       903         MVI     M,4H    ;CHANGE STATE - 4
05FF 216401     904 ST2F.   LXI     H,164H  ;1.5 SEC DELAY TILL START
0602 226C3F     905         SHLD    K6+6CH  ;120 HZ TIMER ++++TEMP+++++
0605 C3CE0E     906         JMP     LAST
                907 ;++++++++++++++++++++++++++++++++++++++++++++++++++
                908 ;       STATE 3 - FEED
                909 ;++++++++++++++++++++++++++++++++++++++++++++++++++
0608 CD0E06     910 ST3.    CALL    ST32
060B C33206     911         JMP     ST3E
060E 21403F     912 ST32.   LXI     H,K6+40H ;DCR CNTR - 4 OR 8 ?
0611 3E03       913         MVI     A,3H
0613 A6         914         ANA     M
0614 CA2006     915         JZ      ST3A
0617 CD9800     916         CALL    FUSER
061A CDA703     917         CALL    DISP
061D C32306     918         JMP     ST3B
0620 CD170E     919 ST3A.   CALL    DIAG
0623 3E0E       920 ST3B.   MVI     A,0EH   ;#1 INPUT ENABLE
0625 D303       921         OUT     K3
0627 D601       922         IN      K4
0629 2F         923         CMA
062A 21603F     924         LXI     H,K6+60H ;#1 INPUT
062D 77         925         MOV     M,A
062E CD990A     926         CALL    K6
0631 C9         927         RET
0632 2E60       928 ST3E.   MVI     L,60H   ;#1 INPUT
0634 3E40       929         MVI     A,40H   ;DEV OFF SW (S-23)
0636 A6         930         ANA     M
0637 CACE0E     931         JZ      LAST
063A 2E41       932         MVI     L,41H
```

```
LOC   OBJ        SEQ         SOURCE STATEMENT 063C 3604        933         MVI    H,4H      ;CHANGE STATE - 4
063E 2E43        934         MVI    L,43H
0640 3E01        935         MVI    A,1H      ;CHECK FOR ROLL OR CASSETTE
0642 A6          936         ANA    H         ;0 = ROLL FEED
0643 C2FF06      937         JNZ    ST2F      ;1.5 SEC TO S-19
0646 2E43        938 ST3D.   MVI    L,43H     ;PLATE LENGTH
0648 46          939         MOV    B,H       ;STORE IN B REG.
0649 3E0F        940         MVI    A,0FH
064B A0          941         ANA    B         ;REMOVE UPPER 4 BITS
064C 1E64        942         MVI    E,64H     ;100
064E CDA96E      943         CALL   MULT      ;RESULT IN D&E
0651 D5          944         PUSH   D         ;STORE RESULT IN STACK
0652 3EF0        945         MVI    A,0F0H    ;STRIP LOWER BITS
0654 A0          946         ANA    B
0655 D620        947         SUI    20H       ;MIN LENGTH - 12.0
0657 DA8B06      948         JC     ST3G      ;MIN LNTH
065A 0F          949         RRC              ;X/2
065B 1E7D        950         MVI    E,7DH     ;125
065D CDA96E      951         CALL   MULT      ;RESULT IN D&E
0660 E1          952         POP    H         ;PREVIOUS RESULT TO H&L
0661 19          953         DAD    D         ;TOTAL IN H&L
0662 1E73        954         MVI    E,73H     ;115 = .115"/MMTR INT
0664 CDC06E      955         CALL   DIV       ;MMTR CUT COUNTS IN E
0667 2E43        956         MVI    L,43H     ;CUTTER FUNCTION + CORRECTION (D)
0669 42          957         MOV    B,D       ;REMAINDER TO B
066A 19          958         DAD    D         ;ADD E + L
066B 65          959         MOV    H,L       ;SET H - L
066C 22BE3F      960 ST3H.   SHLD   K8+6EH    ;MMTR CNTR
066F 78          961         MOV    A,B
0670 07          962         RLC              ;X 2
0671 6F          963         MOV    L,A
0672 2600        964         MVI    H,0H
0674 1E10        965         MVI    E,10H     ;29 - 400HZ DIV FACTOR
0676 CDC06E      966         CALL   DIV
0679 7B          967         MOV    A,E
067A C608        968         ADI    8H        ;MIN 400HZ COUNTS
067C 5F          969         MOV    E,A       ;STORE IN E
067D 21663F      970         LXI    H,K8+66H  ;#7 INPUT
0680 7E          971         MOV    A,M       ;CUT ADJUST
0681 E60F        972         ANI    0FH       ;STRIP 4
0683 07          973         RLC              ;X 2
0684 83          974         ADD    E
0685 2E66        975         MVI    L,66H     ;400 HZ CUT CNTR
0687 77          976         MOV    M,A
0688 C3FF06      977         JMP    ST2F      ;1.5 SEC TO S-19
068B 214000      978 ST3G.   LXI    H,40H     ;PREPARE FOR MIN LENGTH
068E C36C06      979         JMP    ST3H
                 980         ;***********************************************
                 981         ;     STATE 4 - FEED AND REGISTER
                 982         ;***********************************************
0691 CD6E06      983 ST4.    CALL   ST3Z      ;SIMILAR SUBR. SEQU.
0694 2A6E3F      984         LHLD   K8+6EH    ;MMTR CNTR
0697 7D          985         MOV    A,L
0698 FE40        986         CPI    40H       ;READY FOR CUT ?
069A DAA106      987         JC     ST4F      ;DCR 400HZ CNTR
```

```
LOC  OBJ        SEQ        SOURCE STATEMENT

0690 BC         988              CMP    H        ;H - L ?
069E C2AA06     989              JNZ    ST4C
06A1 216B3F     990 ST4F.        LXI    H,K8+6BH ,460 HZ LENGTH CNTR
06A4 AF         991              XRA    A
06A5 BE         992              CMP    H
06A6 CAAA06     993              JZ     ST4C
06A9 35         994              DCR    H        ;IF H - L OR L < 40H
06AA 21603F     995 ST4C.        LXI    H,K8+60H ,#1 INPUT
06AD 46         996              MOV    B,M      ;STORE IN B
06AE 3E10       997              MVI    A,10H    ,START SW (S-19)
06B0 A0         998              ANA    B
06B1 CAE306     999              JZ     ST4A     ;IF S-19 NOT ACTIVE
06B4 2E68       1000             MVI    L,68H    ,MAG MULT FACTOR
06B6 4E         1001             MOV    C,M      ,STORE IN C
06B7 2E4A       1002             MVI    L,4AH    ,#3 OUTPUT
06B9 3EEF       1003             MVI    A,0EFH   ,DRUM START
06BB A6         1004             ANA    M
06BC 77         1005             MOV    M,A
06BD 2C         1006             INR    L        ,#4 OUTPUT
06BE 3EBC       1007             MVI    A,0BCH   ,85% MAG MULT VALUE
06C0 91         1008             SUB    C
06C1 DAC906     1009             JC     ST4D
06C4 3EF6       1010             MVI    A,0F6H   ,LAP ON, RED.ELI. ON
06C6 C3CB06     1011             JMP    ST4E
06C9 3EFE       1012 ST4D.       MVI    A,0FEH   ,LAMP RELAY ON (LAP)
06CB A6         1013 ST4E.       ANA    M
06CC F602       1014             ORI    2H       ,FEED DOWN (SOL 4) OFF
06CE 77         1015             MOV    M,A
06CF 2A713F     1016             LHLD   K8+71H   ,MARGIN ADVANCE REG
06D2 2B         1017             DCX    H
06D3 22713F     1018             SHLD   K8+71H
06D6 3E17       1019             MVI    A,17H    ,.65 SEC
06D8 BD         1020             CMP    L
06D9 CA0007     1021             JZ     ST4G     ,STOP FEED (EMC-2)
06DC AF         1022             XRA    A
06DD BD         1023             CMP    L
06DE C2E306     1024             JNZ    ST4A
06E1 BC         1025             CMP    H
06E2 CC2607     1026             CZ     ST4I     ,STOP ROLL FEED
06E5 21433F     1027 ST4A.       LXI    H,K8+43H ,STATUS
06E8 3E03       1028             MVI    A,3H
06EA A6         1029             ANA    M        ,CHECK FOR ROLL FEED (- 0)
06EB C20E0E     1030             JNZ    LAST     ,MANUAL - 2, CASSETTE - 1
06EE 2E6E       1031             MVI    L,6EH    ,MMTR CNTR (CUT)
06F0 7E         1032             MOV    A,M
06F1 D640       1033             SUI    40H      ,START CUT IF K8+6E < 40H
06F3 D20E0E     1034             JNC    LAST     ,NOT READY FOR CUT
06F6 7E         1035             MOV    A,M
06F7 D636       1036             SUI    36H      ,END OF CUT ?
06F9 2E48       1037             MVI    L,48H    ,#1 OUTPUT
06FB D21107     1038             JNC    ST4B     ,CUT IN PROGRESS
06FE 3E14       1039             MVI    A,14H    ,KNIFE RELAY OFF &
0700 B6         1040             ORA    M        ,ROLL FEED CLUTCH OFF
0701 77         1041             MOV    M,A
0702 3E08       1042             MVI    A,8H     ,ROLL FEED MOTOR OFF ?
```

| LOC OBJ | SEQ | | SOURCE STATEMENT | | |
|---|---|---|---|---|---|
| 0704 A6 | 1843 | | ANA | M | |
| 0705 210000 | 1844 | | LXI | H,0H | |
| 0708 226E3F | 1845 | | SHLD | K8+6EH | ;RESET HMTR CNTR |
| 070B C24F07 | 1846 | | JNZ | ST4H | ;SET UP STATE 5 |
| 070E C3CE0E | 1847 | | JMP | LAST | |
| 0711 2E6B | 1848 ST4B. | | MVI | L,6BH | ;480HZ CUT CNTR |
| 0713 AF | 1849 | | XRA | A | |
| 0714 BE | 1850 | | CMP | M | |
| 0715 C2CE0E | 1851 | | JNZ | LAST | |
| 0718 2E48 | 1852 | | MVI | L,48H | ;#1 OUTPUT |
| 071A 3EFB | 1853 | | MVI | A,0FBH | ;KNIFE RELAY ON |
| 071C A6 | 1854 | | ANA | M | |
| 071D F613 | 1855 | | ORI | 13H | ;ROLL FEED CLUTCH, FUSER OFF |
| 071F 5F | 1856 | | MOV | E,A | |
| 0720 CDE06D | 1857 | | CALL | FUSES | ;ACTIVATE KNIFE |
| 0723 C3CE0E | 1858 | | JMP | LAST | |
| 0726 21483F | 1859 ST4I. | | LXI | H,K8+48H | ;#1 OUTPUT |
| 0729 3E1B | 1860 | | MVI | A,1BH | ;FUSER, ROLL FEED OFF |
| 072B B6 | 1861 | | ORA | M | |
| 072C 5F | 1862 | | MOV | E,A | |
| 072D C3E06D | 1863 | | JMP | FUSES | ;OUTPUT |
| 0730 3E0F | 1864 ST4G. | | MVI | A,0FH | ;REMOVE ENABLE |
| 0732 D303 | 1865 | | OUT | K3 | |
| 0734 214A3F | 1866 | | LXI | H,K8+4AH | |
| 0737 3E80 | 1867 | | MVI | A,80H | ;FEED DRIVE OFF (EMC-2) |
| 0739 B6 | 1868 | | ORA | M | |
| 073A E6FD | 1869 | | ANI | 0FDH | ;CAM REL. SOL ON (SOL-6) |
| 073C 77 | 1870 | | MOV | M,A | |
| 073D D306 | 1871 | | OUT | K6 | |
| 073F 3E1C | 1872 | | MVI | A,1CH | ;#3 ENABLE |
| 0741 D303 | 1873 | | OUT | K3 | |
| 0743 3E0F | 1874 | | MVI | A,0FH | ;REMOVE ENABLE |
| 0745 D303 | 1875 | | OUT | K3 | |
| 0747 2E43 | 1876 | | MVI | L,43H | ;STATUS |
| 0749 3E03 | 1877 | | MVI | A,3H | |
| 074B A6 | 1878 | | ANA | M | ;CASSETTE - 1, MANUAL - 2 |
| 074C CAE006 | 1879 | | JZ | ST4A | ;IF ROLL FEED |
| 074F 21F000 | 1880 ST4H. | | LXI | H,0F0H | ;2 SEC DELAY |
| 0752 226C3F | 1881 | | SHLD | K8+6CH | ;120HZ TIMER |
| 0755 21413F | 1882 | | LXI | H,K8+41H | |
| 0758 3605 | 1883 | | MVI | M,5H | ;CHANGE STATE - 5 |
| 075A 1E7F | 1884 | | MVI | E,7FH | ;AC PWR ON, FUSER ET AL OFF |
| 075C CDE06D | 1885 | | CALL | FUSES | |
| 075F 2E43 | 1886 | | MVI | L,43H | ;STATUS |
| 0761 46 | 1887 | | MOV | B,M | |
| 0762 2E46 | 1888 | | MVI | L,46H | ;MARGIN |
| 0764 7E | 1889 | | MOV | A,M | |
| 0765 1EC8 | 1890 | | MVI | E,0C8H | ;200X |
| 0767 CDA90E | 1891 | | CALL | MULT | ;RESULT IN D&E |
| 076A EB | 1892 | | XCHG | | |
| 076B 1E1D | 1893 | | MVI | E,1DH | ;2 X LENGTH/ 480HZ - 29 |
| 076D CDC00E | 1894 | | CALL | DIV | ;RESULT IN D&E |
| 0770 21343F | 1895 | | LXI | H,K8+34H | ;SCAN START DELAY |
| 0773 73 | 1896 | | MOV | M,E | |
| 0774 3E03 | 1897 | | MVI | A,3H | ;CHECK FOR ROLL FEED |

| LOC  OBJ | SEQ | SOURCE STATEMENT | | |
|---|---|---|---|---|
| 0776 A0 | 1098 | ANA | B | ;STATUS WORD |
| 0777 CC9207 | 1099 | CZ | ST4J | ;ADJUST MARGIN |
| 077A 2E66 | 1100 | MVI | L,66H | ;#7 INPUT |
| 077C 7E | 1101 | MOV | A,M | |
| 077D 0F | 1102 | RRC | | |
| 077E 0F | 1103 | RRC | | ;DIP SWITCH #2 |
| 077F 0F | 1104 | RRC | | |
| 0780 E61E | 1105 | ANI | 1EH | ;STRIP 4 |
| 0782 83 | 1106 | ADD | E | |
| 0783 2F | 1107 | CMA | | |
| 0784 5F | 1108 | MOV | E,A | |
| 0785 16FF | 1109 | MVI | D,0FFH | |
| 0787 13 | 1110 | INX | D | ;TWOS COMPLEMENT |
| 0788 21E000 | 1111 | LXI | H,0E0H | ;MARGIN ADVANCE WAS 066H |
| 078B 19 | 1112 | DAD | D | ;16 BIT SUBTRACT |
| 078C 22713F | 1113 | SHLD | K8+71H | ;400HZ MARGIN COUNTER |
| 078F C3CE6E | 1114 | JMP | LAST | |
| 0792 3E06 | 1115 ST4J: | MVI | A,6H | ;**WAS 11H (17 COUNTS - 1/4") |
| 0794 83 | 1116 | ADD | E | ;ADJUST MARGIN FOR ROLL FEED |
| 0795 5F | 1117 | MOV | E,A | |
| 0796 C9 | 1118 | RET | | |

1119 ;************************************************
1120 ; STATE 5 - DRUM START
1121 ;************************************************

| 0797 CD9D07 | 1122 ST5. | CALL | ST5Z | |
|---|---|---|---|---|
| 079A C3AF07 | 1123 | JMP | ST5A | |
| 079D CD176E | 1124 ST5Z. | CALL | DIAG | |
| 07A0 3E0C | 1125 | MVI | A,0CH | ;#3 INPUT ENABLE |
| 07A2 D303 | 1126 | OUT | K3 | |
| 07A4 DB04 | 1127 | IN | K4 | |
| 07A6 2F | 1128 | CMA | | |
| 07A7 21623F | 1129 | LXI | H,K8+62H | ;#3 INPUT |
| 07AA 77 | 1130 | MOV | M,A | |
| 07AB CD990A | 1131 | CALL | K8 | ;SET ENABLE (GPIO) |
| 07AE C9 | 1132 | RET | | |
| 07AF 216C3F | 1133 ST5A. | LXI | H,K8+6CH | |
| 07B2 3E64 | 1134 | MVI | A,064H | ;.5 SEC DELAY FOR STATE 6 |
| 07B4 BE | 1135 | CMP | M | ;< OR - 64 ? |
| 07B5 D2D207 | 1136 | JNC | ST5B | ;AFTER .5 SEC. START DRUM |
| 07B8 C2CE6E | 1137 | JNZ | LAST | |
| 07BB 21623F | 1138 ST5C. | LXI | H,K8+62H | ;#3 INPUT |
| 07BE 0606 | 1139 | MVI | B,6H | ;JAM CODE |
| 07C0 3E01 | 1140 | MVI | A,1H | ;S-14 - DRUM HOME SW |
| 07C2 A6 | 1141 | ANA | M | |
| 07C3 CA9F03 | 1142 | JZ | JAM | ;IF NOT STARTED |
| 07C6 2E34 | 1143 | MVI | L,34H | ;SCAN START DELAY |
| 07C8 AF | 1144 | XRA | A | |
| 07C9 BE | 1145 | CMP | M | |
| 07CA C2666B | 1146 | JNZ | ST5D | |
| 07CD 21C000 | 1147 | LXI | H,0C0H | ;192 - 21.7" |
| 07D0 226E3F | 1148 | SHLD | K8+6EH | ;MMTR CNTR |
| 07D3 21E002 | 1149 | LXI | H,2E0H | ;4 SEC SCAN ****TEMP |
| 07D6 226C3F | 1150 | SHLD | K8+6CH | ;120 HZ TIMER |
| 07D9 210030 | 1151 | LXI | H,3000H | ;START ADDR FOR SMTR DATA |
| 07DC 22503F | 1152 | SHLD | K8+50H | |

```
LOC   OBJ        SEQ       SOURCE STATEMENT

07DF  21413F     1153              LXI   H,K8+41H
07E2  3606       1154              MVI   M,6H     ;CHANGE STATE - 6
07E4  2E60       1155              MVI   L,60H    ;SHTR RAMP CNTR #1
07E6  360B       1156              MVI   M,0BH    ;11/128 SEC.
07E8  2E76       1157              MVI   L,76H    ;SHTR RAMP CNTR #2
07EA  360C       1158              MVI   M,0CH    ;-12
07EC  2E4A       1159              MVI   L,4AH    ;#3 OUTPUT
07EE  3E8F       1160              MVI   A,08FH   ;HVP (RTN) ON
07F0  A6         1161              ANA   M
07F1  77         1162              MOV   M,A
07F2  AF         1163              XRA   A
07F3  2E49       1164              MVI   L,49H    ;SHTR OUTPUT
07F5  77         1165              MOV   M,A      ;MAX VALUE FOR START
07F6  2E69       1166              MVI   L,69H
07F8  77         1167              MOV   M,A      ;ZERO LENGTH CNTR
07F9  2E73       1168              MVI   L,73H    ;RESTART SIGNAL
07FB  77         1169              MOV   M,A
07FC  CD7904     1170              CALL  VAC2     ;VACSOL OFF
07FF  C3CE6E     1171              JMP   LAST
0802  2E4B       1172  ST5B.       MVI   L,4BH    ;#4 OUTPUT
0804  3EFB       1173              MVI   A,0FBH   ;DEV SOL ON
0806  A6         1174              ANA   M
0807  77         1175              MOV   M,A
0808  C38807     1176              JMP   ST5C
080B  35         1177  ST5D.       DCR   M
080C  C3CE6E     1178              JMP   LAST
                 1179  ;*******************************************
                 1180  ;     STATE 6 - SCAN IMAGE & RESTART
                 1181  ;*******************************************
080F  21403F     1182  ST6:        LXI   H,K8+40H
0812  3E03       1183              MVI   A,3H     ;ENABLE - 4 OR 6 ?
0814  A6         1184              ANA   M
0815  C23808     1185              JNZ   ST6E
0818  2E73       1186              MVI   L,73H    ;RESTART SIGNAL
081A  AF         1187              XRA   A
081B  BE         1188              CMP   M
081C  C23808     1189              JNZ   ST6E
081F  2E60       1190              MVI   L,60H    ;#1 SHTR RAMP CNTR
0821  BE         1191              CMP   M        ;= 0 ?
0822  CA3008     1192              JZ    ST6I     ;SHTR RAMP CNTR #2
0825  35         1193              DCR   M
0826  2E69       1194              MVI   L,69H    ;SHTR DCR FACTOR
0828  7E         1195              MOV   A,M
0829  2E49       1196              MVI   L,49H    ;SHTR OUTPUT
082B  86         1197              ADD   M        ;DECREASE SPEED
082C  77         1198              MOV   M,A
082D  C33808     1199              JMP   ST6E
0830  2E76       1200  ST6I:       MVI   L,76H    ;SHTR RAMP CNTR #2
0832  AF         1201              XRA   A
0833  BE         1202              CMP   M
0834  CA3808     1203              JZ    ST6E
0837  35         1204              DCR   M
0838  CD9D07     1205  ST6E:       CALL  ST5Z     ;SIMILAR SUBROUTINES
083B  21623F     1206              LXI   H,K8+62H ;#3 INPUT
083E  4E         1207              MOV   C,M      ;TO C REG
```

```
LOC  OBJ        SEQ        SOURCE STATEMENT 063F 2E6E       1208           MVI    L,6EH     ;MMTR CNTR
0641 3E02       1209           MVI    A,2H      ;(S-15) LAMP HOME SW ACTIVE ?
0643 A1         1210           ANA    C
0644 C24F06     1211           JNZ    ST6A
0647 0603       1212           MVI    B,3H      ;JAM CODE
0649 3E80       1213           MVI    A,80H     ;0.5 SEC FROM SCAN START
064B BE         1214           CMP    M
064C D20F03     1215           JNC    JAM       ;IF NO SCAN WITHIN 0.5 SEC
064F 3E04       1216 ST6A.     MVI    A,4H
0651 A1         1217           ANA    C         ;S-16 ACTIVE ? (LAMP LIMIT)
0652 CA5E06     1218           JZ     ST6B
0655 2E43       1219           MVI    L,43H     ;SMTR OUTPUT
0657 36FF       1220           MVI    M,0FFH    ;OFF
0659 2C         1221           INR    L         ;#3 OUTPUT
065A 3E02       1222           MVI    A,2H      ;SOL 6 (CAM REL.)
065C B6         1223           ORA    M
065D 77         1224           MOV    M,A
065E 21733F     1225 ST6B.     LXI    H,K0+73H  ;RESTART SIGNAL
0661 AF         1226           XRA    A
0662 BE         1227           CMP    M
0663 C28206     1228           JNZ    ST6C
0666 2E62       1229           MVI    L,62H     ;#3 INPUT
0668 7E         1230           MOV    A,M
0669 E602       1231           ANI    2H        ;LAMP HOME SW ACTIVE ? (S-15)
066B CA8206     1232           JZ     ST6C
066E 2E73       1233           MVI    L,73H     ;RESTART SIGNAL
0670 3601       1234           MVI    M,1H
0672 2E76       1235           MVI    L,76H     ;#2 SMTR RAMP CNTR
0674 3600       1236           MVI    M,0H      ;END OF RAMP
0676 2A713F     1237           LHLD   K0+71H    ;MARGIN
0679 019000     1238           LXI    B,90H     ;MARGIN ADJUST
067C 09         1239           DAD    B
067D 22713F     1240           SHLD   K0+71H
0680 263F       1241           MVI    H,K7      ;RESET FOR RAM ADDR
0682 2E60       1242 ST6C.     MVI    L,60H     ;#1 INPUT
0684 3E02       1243           MVI    A,2H      ;MIDDLE SW (S-20)
0686 A6         1244           ANA    M
0687 C28E06     1245           JNZ    ST6F      ;IF S-20 ACTIVE
068A 2E73       1246           MVI    L,73H     ;RESTART SIGNAL
068C AF         1247           XRA    A
068D BE         1248           CMP    M
068E CACE06     1249           JZ     LAST
0691 2A713F     1250           LHLD   K0+71H    ;MARGIN
0694 2B         1251           DCX    H
0695 22713F     1252           SHLD   K0+71H
0698 BD         1253           CMP    L
0699 C2CE06     1254           JNZ    LAST
069C BC         1255           CMP    H
069D C2CE06     1256           JNZ    LAST
06A0 217800     1257           LXI    H,78H     ;120 MMTR CNTS (10" UNTIL STATE 7)
06A3 226E3F     1258           SHLD   K0+6EH
06A6 214A3F     1259           LXI    H,K0+4AH  ;#3 OUTPUT
06A9 3E7F       1260           MVI    A,7FH     ;EMC-2 ON (FEED DRIVE)
06AB A6         1261           ANA    M
06AC 77         1262           MOV    M,A
```

```
LOC  OBJ          SEQ          SOURCE STATEMENT

06AD 2E43         1263          MVI    L,43H    ;STATUS
06AF 7E           1264          MOV    A,M
06B0 E603         1265          ANI    3H       ;CHECK IF ROLL FEED
06B2 C2CE6E       1266          JNZ    LAST     ;IF NOT
06B5 2E48         1267          MVI    L,48H    ;#1 OUTPUT
06B7 3EF7         1268          MVI    A,0F7H   ;ROLL FEED MTR ON
06B9 A6           1269          ANA    M
06BA 77           1270          MOV    M,A
06BB C3CE6E       1271          JMP    LAST
06BE 2E48         1272 ST6F:    MVI    L,48H    ;#1 OUTPUT
06C0 3E7F         1273          MVI    A,7FH    ;ROLL FEED MTR OFF
06C2 B6           1274          ORA    M
06C3 77           1275          MOV    M,A
06C4 C3CE6E       1276          JMP    LAST
                  1277 ;************************************************
                  1278 ;     STATE 7 - FUSE
                  1279 ;************************************************
06C7 CDCD06       1280 ST7:     CALL   ST7A
06CA C3E906       1281          JMP    ST72
06CD 21483F       1282 ST7A:    LXI    H,K6+48H
06D0 3E03         1283          MVI    A,3H     ;ENABLE - 4 OR 8 ?
06D2 A6           1284          ANA    M
06D3 C2DF06       1285          JNZ    ST7B
06D6 CDF904       1286          CALL   ST1C     ;SCAN RETURN TIMEOUT
06D9 CD8869       1287          CALL   ST7D     ;FMVG SIGNAL UPDATE
06DC C3E206       1288          JMP    ST7C
06DF CD900D       1289 ST7B:    CALL   FUSER
06E2 CD178E       1290 ST7C:    CALL   DIAG
06E5 CD990A       1291          CALL   KB
06E8 C9           1292          RET
06E9 21603F       1293 ST72:    LXI    H,K6+60H ;#1 OF INPUT
06EC 3E20         1294          MVI    A,20H    ;EXIT SW (S-21)
06EE A6           1295          ANA    M
06EF CACE6E       1296          JZ     LAST
06F2 2E4A         1297          MVI    L,4AH    ;#3 OUTPUT
06F4 3E41         1298          MVI    A,41H    ;CYCLE CNTR, HVP OFF
06F6 B6           1299          ORA    M
06F7 77           1300          MOV    M,A
06F8 2E69         1301          MVI    L,69H    ;LENGTH CNTR
06FA 3E28         1302          MVI    A,28H    ;ADD 40
06FC 86           1303          ADD    M
06FD 77           1304          MOV    M,A
06FE 2E41         1305          MVI    L,41H    ;CHANGE STATE - 8
0700 3608         1306          MVI    M,8H
0702 216801       1307          LXI    H,168H   ;3 SEC TILL PAPER OUT
0705 22603F       1308          SHLD   K6+60H   ;120HZ CNTR
0708 C3CE6E       1309          JMP    LAST
070B 21483F       1310 ST7D:    LXI    H,K6+48H ;ENABLE CNTR
070E 3E08         1311          MVI    A,8H
0710 BE           1312          CMP    M        ;- 8 ?
0711 C0           1313          RNZ
0712 2E62         1314          MVI    L,62H    ;#3 INPUT
0714 7E           1315          MOV    A,M
0715 E608         1316          ANI    8H       ;FMVG BIT
0717 2E31         1317          MVI    L,31H    ;FMVG STORAGE
```

| LOC OBJ | SEQ | | SOURCE STATEMENT | | |
|---|---|---|---|---|---|
| 0919 46 | 1318 | | MOV | B,M | |
| 091A 77 | 1319 | | MOV | M,A | ;STORE NEW WORD |
| 091B 2C | 1320 | | INR | L | ;PWVG COUNTER (K6+32) |
| 091C B8 | 1321 | | CMP | B | ;ANY CHANGE ? |
| 091D CA2D09 | 1322 | | JZ | ST7E | ;DECREMENT COUNTER |
| 0920 2E43 | 1323 | | MVI | L,43H | ;STATUS |
| 0922 3E03 | 1324 | | MVI | A,3H | ;CHECK FOR ROLL FEED |
| 0924 A6 | 1325 | | ANA | M | |
| 0925 2E32 | 1326 | | MVI | L,32H | ;PWVG COUNTER |
| 0927 3614 | 1327 | | MVI | M,14H | ;20/60 SEC (PLAIN PAPER) |
| 0929 C0 | 1328 | | RNZ | | |
| 092A 361A | 1329 | | MVI | M,1AH | ;26/60 SEC (PLATE MAT'L) |
| 092C C9 | 1330 | | RET | | |
| 092D 3E32 | 1331 | ST7E. | MVI | A,32H | ;COUNTER < 00 ? DELAY VAC1 |
| 092F BE | 1332 | | CMP | M | ;CHECK PWVG COUNTER |
| 0930 D46B04 | 1333 | | CNC | VAC1 | |
| 0933 2E32 | 1334 | | MVI | L,32H | ;PWVG COUNTER |
| 0935 AF | 1335 | | XRA | A | |
| 0936 BE | 1336 | | CMP | M | ; - 0 ? |
| 0937 CA3D09 | 1337 | | JZ | ST7F | |
| 093A 35 | 1338 | | DCR | M | |
| 093B C9 | 1339 | | RET | | |
| 093C 2E69 | 1340 | ST7F. | MVI | L,69H | ;LENGTH MEASURE |
| 093E 0602 | 1341 | | MVI | B,2H | ;JAM CODE |
| 0940 3E30 | 1342 | | MVI | A,30H | ; - 4.8" |
| 0942 BE | 1343 | | CMP | M | |
| 0943 D20F03 | 1344 | | JNC | JAM | |
| 0946 C9 | 1345 | | RET | | |
| | 1346 | ;************************************** | | | |
| | 1347 | ; | STATE 8 - EXIT | | |
| | 1348 | ;************************************** | | | |
| 0947 C0CD08 | 1349 | ST8. | CALL | ST7A | ;SIMILAR SUBROUTINES |
| 094A 21603F | 1350 | | LXI | H,K6+60H,120HZ CNTR MSB | |
| 094D AF | 1351 | | XRA | A | |
| 094E BE | 1352 | | CMP | M | ;15SEC DELAY FOR HOME |
| 094F C20609 | 1353 | | JNZ | ST8E | |
| 0952 CDF602 | 1354 | | CALL | HOME | |
| 0955 2E4A | 1355 | | MVI | L,4AH | ;#3 OUTPUT |
| 0957 3EF7 | 1356 | | MVI | A,0F7H | ;HOT ON |
| 0959 A6 | 1357 | | ANA | M | |
| 095A 77 | 1358 | | MOV | M,A | |
| 095B 2E60 | 1359 | ST8E. | MVI | L,60H | ;#1 INPUT |
| 095D 3E20 | 1360 | | MVI | A,20H | ;EXIT SW (S-21) |
| 095F A6 | 1361 | | ANA | M | |
| 0960 C26E09 | 1362 | | JNZ | LAST | |
| 0963 CD6909 | 1363 | | CALL | ST8A | |
| 0966 C3CF04 | 1364 | | JMP | ST1F | ;CHANGE STATE - 2, 10 MIN |
| 0969 2E43 | 1365 | ST8A. | MVI | L,43H | ;STATUS |
| 096B 3EF7 | 1366 | | MVI | A,0F7H | ;RESET FUNC. PENDING |
| 096D A6 | 1367 | | ANA | M | |
| 096E 77 | 1368 | | MOV | M,A | |
| 096F 2E5C | 1369 | | MVI | L,5CH | ;#3 DISP VAL. |
| 0971 AF | 1370 | | XRA | A | |
| 0972 BE | 1371 | | CMP | M | |
| 0973 CA7809 | 1372 | | JZ | ST8B | |

| LOC OBJ | SEQ | | SOURCE STATEMENT | | |
|---|---|---|---|---|---|
| 0976 35 | 1373 | | DCR | H | |
| 0977 C9 | 1374 | | RET | | |
| 0978 2C | 1375 ST6B. | | INR | L | |
| 0979 BE | 1376 | | CMP | M | |
| 097A CA8189 | 1377 | | JZ | ST6C | ;CHECK #7 DISP |
| 097D 35 | 1378 | | DCR | M | |
| 097E C38C89 | 1379 | | JMP | ST6D | |
| 0981 2C | 1380 ST6C. | | INR | L | ,#7 DISP |
| 0982 BE | 1381 | | CMP | M | |
| 0983 C8 | 1382 | | RZ | | |
| 0984 3E60 | 1383 | | MVI | A,60H | ,F. ? |
| 0986 BE | 1384 | | CMP | M | |
| 0987 C8 | 1385 | | RZ | | |
| 0988 35 | 1386 | | DCR | M | |
| 0989 2D | 1387 | | DCR | L | ,#6 DISP |
| 098A 3609 | 1388 | | MVI | M,9H | |
| 098C 2D | 1389 ST6D. | | DCR | L | ,#5 DISP |
| 098D 3609 | 1390 | | MVI | M,9H | |
| 098F C9 | 1391 | | RET | | |
| | 1392 | ;******************************************* | | | |
| | 1393 | ; | TBL4 DEFINES IMAGE CODES FOR DISP. | | |
| | 1394 | ;******************************************* | | | |
| | 1395 | ; | | | |
| 0990 00 | 1396 | | DB | 00H | , ALL OFF |
| 0991 3F | 1397 TBL4. | | DB | 3FH | , 0 |
| 0992 06 | 1398 | | DB | 6H | , 1     * * * * * * * |
| 0993 5B | 1399 | | DB | 5BH | , 2     *       1       * |
| 0994 4F | 1400 | | DB | 4FH | , 3     * 20            2 * |
| 0995 66 | 1401 | | DB | 66H | , 4     *       40       * |
| 0996 6D | 1402 | | DB | 6DH | , 5     * * * * * * * |
| 0997 7D | 1403 | | DB | 7DH | , 6     *               * |
| 0998 07 | 1404 | | DB | 7H | , 7     * 10           4 * |
| 0999 7F | 1405 | | DB | 7FH | , 8     *       8       * |
| 099A 67 | 1406 | | DB | 67H | , 9     * * * * * * *   * 80 |
| 099B F7 | 1407 | | DB | 0F7H | , A. FUNCTION - CLEAR |
| 099C 63 | 1408 | | DB | 63H | , C. FUNCTION - START |
| 099D F9 | 1409 | | DB | 0F9H | , E. FUNCTION #1 |
| 099E F1 | 1410 | | DB | 0F1H | , F. FUNCTION #2 |
| 099F 76 | 1411 | | DB | 76H | , "H" & FUNCION #3 |
| 09A0 9E | 1412 | | DB | 9EH | , J. FUNCTION #4 |
| 09A1 79 | 1413 | | DB | 79H | , E  ERROR |
| 09A2 40 | 1414 | | DB | 40H | , - |
| 09A3 63 | 1415 | | DB | 63H | , MAG. FUNCTION SYMBOL |
| 09A4 38 | 1416 | | DB | 38H | , "L" - LENGTH |
| 09A5 C1 | 1417 | | DB | 0C1H | , MARGIN SYMBOL |
| 09A6 E4 | 1418 | | DB | 0E4H | , SUPPLY SELECT SYMBOL |
| | 1419 | ;******************************************* | | | |
| | 1420 | ; | REFRESH DISPLAY | | |
| | 1421 | ;******************************************* | | | |
| | 1422 | ; | | | |
| 09A7 3E6F | 1423 DISP. | | MVI | A,6FH | ,REMOVE ENABLES |
| 09A9 D303 | 1424 | | OUT | K3 | |
| 09AB 2148DF | 1425 | | LXI | H,K6+40H | |
| 09AE 4E | 1426 | | MOV . | C,M | ,DCR COUNTER TO C REG |
| 09AF 3E07 | 1427 | | MVI | A,07H | ,PREPARE ADDRESS |

```
LOC  OBJ       SEQ       SOURCE STATEMENT

0B81 81       1428       ADD   C          ;ADD COUNTER VALUE TO 57H
0B82 6F       1429       MOV   L,A        ;K6+57+C-ADDRESS
0B83 7E       1430       MOV   A,M        ;LOAD VALUE TO ACCUM.
0B84 FE00     1431       CPI   0H         ;CHECK IF 0
0B86 CA060A   1432       JZ    D1         ;LEADING 0 ?
0B89 21910B   1433       LXI   H,TBL4
0B8C 85       1434       ADD   L          ;DISP. IMAGE ADDR.
0B8D 0C400A   1435       CC    D5
0B90 6F       1436       MOV   L,A
0B91 56       1437       MOV   D,M        ;IMAGE IN D REG.
0B92 79       1438 D6.   MOV   A,C
0B93 FE02     1439       CPI   2H         ;#2 DISP ?
0B95 C2010B   1440       JNZ   D8
0B98 214C3F   1441       LXI   H,K6+4CH   ;#5 OUTPUT
0B9B 3E20     1442       MVI   A,20H      ;SUPPLY SELECT
0B9D A6       1443       ANA   M
0B9E CA400A   1444       JZ    D10
0BA1 3E02     1445 D8.   MVI   A,2H
0BA3 B9       1446       CMP   C          ;ENABLE > 2 ?
0BA4 D4FD0B   1447       CNC   D13        ;CHECK DECIMAL POINT
0BA7 AF       1448       XRA   A          ;BLANK OUT IMAGE
0BA8 D302     1449       OUT   K6
0BAA 3E10     1450       MVI   A,10H      ;#13 ENABLE
0BAC D303     1451       OUT   K3
0BAE 3E08     1452       MVI   A,8H
0BB0 81       1453       ADD   C
0BB1 2F       1454       CMA
0BB2 E60F     1455       ANI   0FH
0BB4 D303     1456       OUT   K3
0BB6 F620     1457       ORI   20H
0BB8 D303     1458       OUT   K3         ;LATCH DISP/KB ENABLE
0BBA 21703F   1459       LXI   H,K6+70H   ;KB TEMP HOLD
0BBD 7A       1460       MOV   A,D
0BBE D302     1461       OUT   K6         ;OUTPUT IMAGE TO DISPLAY
0BC0 3E10     1462       MVI   A,10H      ;#13 ENABLE - KB/DISP
0BC2 D303     1463       OUT   K3
0BC4 DB01     1464       IN    K4         ;KB WORD
0BC6 2F       1465       CMA
0BC7 77       1466       MOV   M,A        ;STORE IN TEMP HOLD
0BC8 3E0F     1467       MVI   A,0FH
0BCA D303     1468       OUT   K3         ;REMOVE ENABLE
0BCC C9       1469       RET              ;END OF DISP SUBR.
0BCD 21333F   1470 D13.  LXI   H,K6+33H   ;DECIMAL REGISTER
0BD0 AF       1471       XRA   A
0BD1 BE       1472       CMP   M
0BD2 C8       1473       RZ               ;RETURN IF MEM - 0
0BD3 7E       1474       MOV   A,M
0BD4 B9       1475       CMP   C          ;MEM - ENABLE ?
0BD5 C0       1476       RNZ
0BD6 7A       1477       MOV   A,D
0BD7 F680     1478       ORI   80H        ;ADD DEC. POINT
0BD9 57       1479       MOV   D,A
0BDA C9       1480       RET
0BDB 79       1481 D1.   MOV   A,C
0BDC FE03     1482       CPI   3H         ;#3 DISP?
```

| LOC | OBJ | SEQ | | SOURCE STATEMENT | | |
|---|---|---|---|---|---|---|
| 0A0E | CA260A | 1483 | | JZ | D7 | |
| 0A11 | FE06 | 1484 | | CPI | 6H | ,#6 DISP? |
| 0A13 | CA2D0A | 1485 | | JZ | D14 | |
| 0A16 | FE01 | 1486 | | CPI | 1H | ,#1 DISP? |
| 0A18 | CA3D0A | 1487 | | JZ | D2 | |
| 0A1B | 3E02 | 1488 | | MVI | A,2H | |
| 0A1D | B9 | 1489 | | CMP | C | ,#2 DISP ? |
| 0A1E | CA3D0A | 1490 | | JZ | D3 | |
| 0A21 | 1606 | 1491 D4. | | MVI | D,6H | ,BLANK OUT IMAGE |
| 0A23 | C30209 | 1492 | | JMP | D8 | |
| 0A26 | AF | 1493 D7. | | XRA | A | |
| 0A27 | 2C | 1494 | | INR | L | ,#6 DISP |
| 0A28 | BE | 1495 | | CMP | M | ,= 0 ? |
| 0A29 | C23D0A | 1496 | | JNZ | D2 | |
| 0A2C | AF | 1497 D14. | | XRA | A | |
| 0A2D | 2C | 1498 | | INR | L | ,#7 DISP |
| 0A2E | BE | 1499 | | CMP | M | ,= 0 ? |
| 0A2F | CA210A | 1500 | | JZ | D4 | |
| 0A32 | 3E60 | 1501 | | MVI | A,60H | ,F. ? |
| 0A34 | BE | 1502 | | CMP | M | |
| 0A35 | CA210A | 1503 | | JZ | D4 | |
| 0A38 | 163F | 1504 D2. | | MVI | D,3FH | ,SHOW ZERO IMAGE |
| 0A3A | C30209 | 1505 | | JMP | D8 | |
| 0A3D | 21A03F | 1506 D3. | | LXI | H,K8+0AH | ,#3 DISP ADDR |
| 0A40 | AF | 1507 | | XRA | A | |
| 0A41 | BE | 1508 | | CMP | M | |
| 0A42 | C23D0A | 1509 | | JNZ | D2 | |
| 0A45 | C3210A | 1510 | | JMP | D4 | |
| 0A48 | 24 | 1511 D5. | | INR | H | |
| 0A49 | C9 | 1512 | | RET | | |
| 0A4A | 2E0A | 1513 D10. | | MVI | L,0AH | ,#3 DISP |
| 0A4C | AF | 1514 | | XRA | A | |
| 0A4D | 77 | 1515 | | MOV | M,A | |
| 0A4E | 2E08 | 1516 | | MVI | L,08H | ,#1 DISP |
| 0A50 | BE | 1517 | | CMP | M | |
| 0A51 | 2E09 | 1518 | | MVI | L,09H | ,#2 DISP |
| 0A53 | CA600A | 1519 | | JZ | D11 | ,"LO" |
| 0A56 | 36E | 1520 | | MVI | M,6EH | ,"HI" |
| 0A58 | C30109 | 1521 | | JMP | D8 | |
| 0A5B | 3613 | 1522 D11. | | MVI | M,13H | ,"L" |
| 0A5D | C30109 | 1523 | | JMP | D8 | |
| 0A60 | 2E41 | 1524 D12. | | MVI | L,41H | ,STATE |
| 0A62 | 3E02 | 1525 | | MVI | A,2H | |
| 0A64 | BE | 1526 | | CMP | M | ,STATE > 2? |
| 0A65 | D8 | 1527 | | RC | | |
| 0A66 | 3D | 1528 | | DCR | A | |
| 0A67 | BE | 1529 | | CMP | M | |
| 0A68 | CA740A | 1530 | | JZ | D6 | ,IF STATE = 1 |
| 0A6B | 2E77 | 1531 | | MVI | L,77H | ,128HZ RESET |
| 0A6D | 77 | 1532 | | MOV | M,A | ,REG A = 1 |
| 0A6E | 210008 | 1533 | | LXI | H,0A00H | ,22 SEC TILL FUNC DISP |
| 0A71 | 22603F | 1534 | | SHLD | K8+60H | ,128HZ CNTR |
| 0A74 | 21803F | 1535 D6. | | LXI | H,K8+80H | ,AUG FUNCTION PENDING |
| 0A77 | BE | 1536 | | CMP | M | ,= 1 ? |
| 0A78 | C8 | 1537 | | RZ | | |

```
LOC  OBJ          SEQ         SOURCE STATEMENT

6A73 2E30        1538              MVI    L,30H    ;FUNCTION VALUE DISP REG
6A7B BE          1539              CMP    M        ;-1 ?
6A7C CA846A      1540              JZ     D9       ;CLEAR DISPLAY IF BIT SET
6A7F 2E30        1541              MVI    L,30H    ;FUNC VALUE DISP REG
6A81 3600        1542              MVI    M,0H
6A83 C9          1543              RET
6A84 2E43        1544 D9.          MVI    L,43H    ;STATUS
6A86 3E08        1545              MVI    A,8H     ;FUNC PENDING BIT ?
6A88 A6          1546              ANA    M
6A89 CA006B      1547              JZ     CLR      ;IF NOT SET
6A8C 3E12        1548              MVI    A,12H    ;DECIMAL POINT VALUE
6A8E B8          1549              CMP    B
6A8F CA776B      1550              JZ     CLR1
6A92 3E09        1551              MVI    A,9H
6A94 90          1552              SUB    B        ;BINARY VALUE > 9 ?
6A95 D8          1553              RC
6A96 C3776B      1554              JMP    CLR1     ;IF 0 THRU 9
                 1555 ;***************************************
                 1556 ;    INSPECT KEYBOARD - GP INPUT/OUTPUT
                 1557 ;***************************************
                 1558 ;
6A99 CD9F6A      1559 K6.          CALL   GPIO
6A9C C3C76A      1560              JMP    KB4
6A9F 21403F      1561 GPIO.        LXI    H,K8+40H ;CNTR FOR ENABLE
6AA2 4E          1562              MOV    C,M
6AA3 3E0F        1563 GPIOA.       MVI    A,0FH
6AA5 D303        1564              OUT    K3       ;REMOVE ENABLE
6AA7 263F        1565              MVI    H,K7
6AA9 3E47        1566              MVI    A,47H    ;PREPARE ADDRESS
6AAB 81          1567              ADD    C        ;  OF GP OUTPUT
6AAC 6F          1568              MOV    L,A
6AAD 7E          1569              MOV    A,M
6AAE D306        1570              OUT    K6
6AB0 7D          1571              MOV    A,L
6AB1 C616        1572              ADI    16H      ;GP INPUT ADDRESS
6AB3 6F          1573              MOV    L,A
6AB4 79          1574              MOV    A,C
6AB5 2F          1575              CMA
6AB6 E60F        1576              ANI    0FH      ;STRIP UPPER CONTROL BITS
6AB8 F616        1577              ORI    16H      ;SET OUTPUT CONTROL BIT
6ABA D303        1578              OUT    K3       ;ENABLE & LEAVE IT SET
6ABC DB04        1579 GPIOB.       IN     K4       ;GP INPUT
6ABE 2F          1580              CMA
6ABF 47          1581              MOV    B,A      ;STORE IN B
6AC0 DB04        1582              IN     K4       ;DEBOUNCE
6AC2 2F          1583              CMA
6AC3 B8          1584              CMP    B
6AC4 C0          1585              RNZ             ;RETURN IF UNSTABLE
6AC5 77          1586              MOV    M,A      ;STORE IN RAM
6AC6 C9          1587              RET
6AC7 3E03        1588 KB4.         MVI    A,3H     ;MAX KB ENABLE
6AC9 B9          1589              CMP    C
6ACA D8          1590              RC              ;OUT OF SUBR. IF > 3
6ACB 7D          1591              MOV    A,L
6ACC D616        1592              SUI    16H      ;PREPARE ADDRESS OF
```

```
LOC  OBJ         SEQ       SOURCE STATEMENT

0A0E 47          1093      MOV    B,A       ;LAST KB WORD
0AFF 2E75        1094      MVI    L,75H     ;KB TEMP HOLD
0A01 7E          1095      MOV    A,M       ;KB WORD TO REG A
0A02 00          1096      NOP
0A02 E66F        1097      ANI    6FH       ;STRIP OFF LEADING BITS
0A05 68          1098      MOV    L,B       ;LAST KB WORD ADDR.
0A06 5E          1099      MOV    E,M       ;LAST K/B WORD TO E REG
0A07 BB          1100      CMP    E         ;COMPARE TO LAST VALUE
0A08 C8          1101      RZ               ;IF NO CHANGE
0A09 57          1102      MOV    D,A
0A0A 72          1103      MOV    M,D       ;STORE NEW KB WORD IN RAM
0A0B 1E04        1104      MVI    E,4H      ;LOOP COUNTER
0A0D 3E08        1105      MVI    A,8H      ;SET #3 BIT
0A0F BA          1106 KB1. CMP    D         ;TEST K/B WORD FOR MATCH WITH
0A10 CA230A      1107      JZ     KB2       ;SINGLE BIT. JUMP IF MATCH.
0A13 1F          1108      RAR              ;SHIFT TEST BIT TO RIGHT
0A14 1D          1109      DCR    E         ;DECREMENT COUNTER 4 LOOPS
0A15 C20F0A      1110      JNZ    KB1       ;TRY AGAIN
0A18 C9          1111      RET              ;IF NO MATCH (DBLE KEY?)
0A19 79          1112 KB2. MOV    A,C       ;DECR COUNTER TO A REG
0A1A 3D          1113      DCR    A
0A1B 17          1114      RAL
0A1C 17          1115      RAL              ;JUST COMPLETED 4(C-1)
0A1D 83          1116      ADD    E
0A1E 47          1117      MOV    B,A
0A1F 05          1118      DCR    B         ;BINARY VALUE IN B REG.
0A20 CD600A      1119      CALL   D12       ;SET UP DISPLAY TIMING
0A23 3E09        1120      MVI    A,9H
0A25 90          1121      SUB    B         ;VALUES > 9 ARE FUNCTIONS
0A26 DA050B      1122      JC     KB3       ;JUMP IF MINUS
0A29 2E08        1123 KB0. MVI    L,08H     ;#1 DISP. VAL. ADDR.
0A2B 56          1124      MOV    D,M       ;TO D REG.
0A2C 70          1125      MOV    M,B       ;NEW VAL INTO #1
0A2D 2C          1126      INR    L
0A2E 46          1127      MOV    B,M       ;#2 TO B
0A2F 72          1128      MOV    M,D       ;#1 TO #2
0A30 2C          1129      INR    L
0A31 70          1130      MOV    M,B       ;#2 TO #3
0A32 2E33        1131      MVI    L,33H     ;DEC POINT REG
0A34 AF          1132      XRA    A
0A35 BE          1133      CMP    M
0A36 C8          1134      RZ
0A37 34          1135      INR    M         ;SHIFT DEC POINT
0A38 C9          1136      RET              ;END OF ROUTINE
                 1137 ;
                 1138 ;***********************************************
                 1139 ;     KEYBOARD FUNCTIONS
                 1140 ;***********************************************
                 1141 ;
0A39 3E12        1142 KB3. MVI    A,12H     ;DECIMAL POINT VALUE
0A3B B8          1143      CMP    B
0A3C CA500B      1144      JZ     DCML      ;ADD DEC POINT
0A3F 3E0A        1145      MVI    A,0AH     ;CLEAR FUNCTION
0A41 B8          1146      CMP    B         ;COMPARE TO REG B
0A42 CA000B      1147      JZ     CLR       ;INITIALIZE RAM AGAIN
```

```
LOC   OBJ      SEQ        SOURCE STATEMENT 0615 2E43      1648       MVI     L,43H   ;STATUS REG.
0617 3E08      1649       MVI     A,8H
0619 A6        1650       ANA     M       ;CHECK FUNC. PEND. BIT
061A CA3506    1651       JZ      KB5
061D CD810C    1652       CALL    SPLY
0620 CD0D06    1653 KB6:  CALL    CLR
0623 2E6C      1654       MVI     L,6CH   ;128HZ CNTR LSB
0625 36FF      1655       MVI     M,0FFH  ;2 SEC TILL FUNC DISP
0627 CD9306    1656       CALL    FUNC    ;ACTIVATE FUNC VAL DISP
062A 2E41      1657       MVI     L,41H   ;STATE
062C 3E01      1658       MVI     A,1H
062E BE        1659       CMP     M       ;STATE - 1 ?
062F C8        1660       RZ
0630 2E6D      1661       MVI     L,6DH   ;128HZ CNTR - MSB
0632 36FF      1662       MVI     M,0FFH
0634 C9        1663       RET
0635 3E08      1664 KB5:  MVI     A,08H   ;START FUNCTION
0637 B6        1665       CMP     B
0638 CA9006    1666       JZ      FRT
063B 3E08      1667       MVI     A,8H
063D B6        1668       ORA     M
063E 77        1669       MOV     M,A     ;SET FUNC. PENDING BIT
063F 2E7C      1670       MVI     L,7CH   ;KB FUNC. MATCH WORD
0641 72        1671       MOV     M,D     ;LOCK OUT OTHER KEYS
0642 CD7706    1672       CALL    CLR1
0645 CD9306    1673       CALL    FUNC    ;SET FUNC VAL DISP BIT
0648 3E6C      1674       MVI     A,6CH   ;SUPPLY SELECT
064A B8        1675       CMP     B
064B CA8206    1676       JZ      SPL
064E 3C        1677       INR     A       ;REDUCE (6DH)
064F B8        1678       CMP     B
0650 CABF06    1679       JZ      MRG
0653 3C        1680       INR     A       ;MARGIN (6EH)
0654 B8        1681       CMP     B
0655 CAD106    1682       JZ      MAR
0658 3C        1683       INR     A       ;LENGTH (6FH)
0659 B8        1684       CMP     B
065A CAE006    1685       JZ      LEN
065D 21413F    1686 CLR:  LXI     H,K8+41H ;STATE
0660 3E02      1687       MVI     A,2H
0662 BE        1688       CMP     M       ;> 2 ?
0663 DA7706    1689       JC      CLR1
0666 2E43      1690       MVI     L,43H   ;STATUS
0668 7E        1691       MOV     A,M
0669 E6F7      1692       ANI     0F7H    ;RESET FUNC. PENDING BIT
066B 77        1693       MOV     M,A
066C 2E48      1694       MVI     L,48H   ;#4 OUTPUT
066E 3EF0      1695       MVI     A,0F0H  ;DIAG,RED. LAMPS OFF
0670 B6        1696       ORA     M       ;COUNT, QUAN LAMPS OFF
0671 77        1697       MOV     M,A
0672 2C        1698       INR     L       ;#5 OUTPUT
0673 3EE3      1699       MVI     A,0E3H  ;MARGIN,CYCLE,ERROR,SUPPLY,
0675 B6        1700       ORA     M       ;LENGTH LAMPS OFF
0676 77        1701       MOV     M,A
0677 213F3F    1702 CLR1: LXI     H,K8+3FH ;CLEAR K8+3F TO K8+38 IN RAM
```

| LOC OBJ | SEQ | | SOURCE STATEMENT | | |
|---|---|---|---|---|---|
| 067A 1E09 | 1703 | | MVI | E,9H | |
| 067C AF | 1704 | | XRA | A | |
| 067D 1D | 1705 | CLR6. | DCR | E | ,8 LOOPS |
| 067E CA8606 | 1706 | | JZ | CLR2 | |
| 0681 77 | 1707 | | MOV | M,A | |
| 0682 2D | 1708 | | DCR | L | |
| 0683 C37D06 | 1709 | | JMP | CLR6 | ,NEXT LOOP |
| 0686 2E33 | 1710 | CLR2. | MVI | L,33H | ,DEC POINT |
| 0688 77 | 1711 | | MOV | M,A | ,CLEAR REGISTER |
| 0689 2E38 | 1712 | | MVI | L,38H | ,FUNC VAL DISP REG |
| 068B 77 | 1713 | | MOV | M,A | |
| 068C C9 | 1714 | | RET | | |
| 068D 21333F | 1715 | DCML. | LXI | H,K8+33H | ,DECIMAL POINT STORAGE |
| 0690 3601 | 1716 | | MVI | M,1H | |
| 0692 C9 | 1717 | | RET | | |
| 0693 2E38 | 1718 | FUNC. | MVI | L,38H | ,FUNCTION VALUE DISP REG |
| 0695 3601 | 1719 | | MVI | M,1H | |
| 0697 2E77 | 1720 | | MVI | L,77H | ,120HZ RESET REG |
| 0699 3600 | 1721 | | MVI | M,0H | |
| 069B C9 | 1722 | | RET | | |
| 069C 213E3F | 1723 | PRT. | LXI | H,K8+3EH | ,#7 DISP |
| 069F 7E | 1724 | | MOV | A,M | |
| 06A0 FE0D | 1725 | | CPI | 0DH | ,F. ? (DIAGNOSTICS) |
| 06A2 C8 | 1726 | | RZ | | |
| 06A3 2E36 | 1727 | | MVI | L,36H | ,ADDR. FOR #1 DISP IMAGE |
| 06A5 7E | 1728 | | MOV | A,M | |
| 06A6 2C | 1729 | | INR | L | ,NEXT ADDR. - #2 DISP |
| 06A7 56 | 1730 | | MOV | D,M | |
| 06A8 2C | 1731 | | INR | L | ,#3 DISP |
| 06A9 5E | 1732 | | MOV | E,M | |
| 06AA 2E3C | 1733 | | MVI | L,3CH | ,ADDR. FOR #5 DISP IMAGE |
| 06AC 77 | 1734 | | MOV | M,A | ,#1 TO #5 |
| 06AD 2C | 1735 | | INR | L | ,#2 TO #6 |
| 06AE 72 | 1736 | | MOV | M,D | |
| 06AF 2C | 1737 | | INR | L | ,#3 TO #7 |
| 06B0 73 | 1738 | | MOV | M,E | |
| 06B1 C9 | 1739 | | RET | | |
| 06B2 2E4C | 1740 | SPL. | MVI | L,4CH | ,#5 OUTPUT |
| 06B4 3EDF | 1741 | | MVI | A,0DFH | ,SUPPLY LAMP ON |
| 06B6 A6 | 1742 | | ANA | M | |
| 06B7 77 | 1743 | | MOV | M,A | |
| 06B8 2E6A | 1744 | | MVI | L,6AH | ,SUPPLY SELECT REG |
| 06BA 7E | 1745 | SPL1. | MOV | A,M | |
| 06BB 2E36 | 1746 | SPL2. | MVI | L,36H | ,#1 DISP |
| 06BD 77 | 1747 | | MOV | M,A | |
| 06BE C9 | 1748 | | RET | | |
| 06BF 2E4E | 1749 | MAG. | MVI | L,4EH | ,#4 OUTPUT |
| 06C1 3EEF | 1750 | | MVI | A,0EFH | ,REDUCE LAMP ON |
| 06C3 A6 | 1751 | | ANA | M | |
| 06C4 77 | 1752 | | MOV | M,A | |
| 06C5 2E44 | 1753 | | MVI | L,44H | ,MAGNIFICATION REG. |
| 06C7 AF | 1754 | | XRA | A | |
| 06C8 BE | 1755 | | CMP | M | , - 100% ? |
| 06C9 C2F006 | 1756 | | JNZ | LEN1 | ,LOAD VALUE TO DISP |
| 06CC 2E3A | 1757 | | MVI | L,3AH | ,#3 DISP |

```
LOC  OBJ         SEQ          SOURCE STATEMENT

06CE 3601        1758         MVI   M,1H      ,SHOW 100
06D0 C9          1759         RET
06D1 2E33        1760 MAR.    MVI   L,33H     ,DEC POINT REG
06D3 3602        1761         MVI   M,2H
06D5 2E4C        1762         MVI   L,4CH     ,#3 OUTPUT
06D7 3E7F        1763         MVI   A,7FH     ,MARGIN LAMP ON
06D9 A6          1764         ANA   M
06DA 77          1765         MOV   M,A
06DB 2E46        1766         MVI   L,46H     ,MARGIN REGISTER
06DD C36A0B      1767         JMP   SPL1
06E0 2E33        1768 LEN.    MVI   L,33H     ,DEC POINT
06E2 3602        1769         MVI   M,2H      , TO #2 DISP
06E4 2E4C        1770         MVI   L,4CH     ,#3 OUTPUT
06E6 3E6F        1771         MVI   A,6FH     ,LENGTH LAMP ON
06E8 A6          1772         ANA   M
06E9 77          1773         MOV   M,A
06EA 2E3A        1774         MVI   L,3AH     ,#3 DISP
06EC 3601        1775         MVI   M,1H
06EE 2E45        1776         MVI   L,45H     ,PLATE LENGTH RE.
06F0 46          1777 LEN1.   MOV   B,M
06F1 78          1778         MOV   A,B
06F2 0F          1779         RRC             ,DIVIDE BY 16
06F3 0F          1780         RRC
06F4 0F          1781         RRC
06F5 0F          1782         RRC
06F6 E60F        1783         ANI   0FH       ,STRIP OFF 4 BITS
06F8 2E39        1784         MVI   L,39H     ,#2 DISP
06FA 77          1785         MOV   M,A
06FB 3E0F        1786         MVI   A,0FH
06FD A0          1787         ANA   B         ,LOWER 4 BITS
06FE C3880B      1788         JMP   SPL2      ,STORE IN #1 DISP
                 1789 ,****************************************
                 1790 ,     SUPPLY SELECT SUBROUTINE
                 1791 ,****************************************
0C01 2E7C        1792 SPLY.   MVI   L,7CH     ,KB MATCH WORD
0C03 7E          1793         MOV   A,M
0C04 A2          1794         ANA   D
0C05 CA060C      1795         JZ    RED07     ,IF NO MATCH
0C08 FE01        1796         CPI   1H        ,SUPPLY SELECT KEY ?
0C0A C21A0C      1797         JNZ   MARG
0C0D 2E38        1798         MVI   L,38H     ,#1 DISP
0C0F AF          1799         XRA   A         ,0 - ROLL, 1-CASSETTE
0C10 BE          1800         CMP   M
0C11 C4180C      1801         CNZ   SPLY1
0C14 2E6A        1802 SPLY2.  MVI   L,6AH     ,SUPPLY SELECT REG
0C16 77          1803         MOV   M,A
0C17 C9          1804         RET
0C18 3C          1805 SPLY1.  INR   A         ,SET - 1
0C19 C9          1806         RET
                 1807 ,****************************************
                 1808 ,     MARGIN SELECT SUBROUTINE
                 1809 ,****************************************
0C1A FE04        1810 MARG.   CPI   4H        ,MARGIN KEY ?
0C1C C2260C      1811         JNZ   LNTH
0C1F 2E38        1812         MVI   L,38H     ,#1 DISP
```

| LOC OBJ | SEQ | | SOURCE STATEMENT | |
|---|---|---|---|---|
| 6021 7E | 1813 | | MOV | A,M |
| 6022 2E46 | 1814 | | MVI | L,46H ,MARGIN REG. |
| 6024 77 | 1815 | | MOV | M,A |
| 6025 C9 | 1816 | | RET | |
| | 1817 | ;************************************************ | | |
| | 1818 | ; | LENGTH SELECT SUBROUTINE | |
| | 1819 | ;************************************************ | | |
| 6026 FE06 | 1820 | LNTH. | CPI | 6H ,LENGTH SELECT KEY ? |
| 6028 C2506C | 1821 | | JNZ | REDU |
| 602B 2E0A | 1822 | | MVI | L,0AH ,#3 DISP |
| 602D 3E01 | 1823 | | MVI | A,1H |
| 602F BE | 1824 | | CMP | M |
| 6030 C0 | 1825 | | RNZ | |
| 6031 CD376C | 1826 | | CALL | LNTH3 |
| 6034 C3446C | 1827 | | JMP | LNTH4 |
| 6037 2E08 | 1828 | LNTH3. | MVI | L,08H ,#1 DISP |
| 6039 7E | 1829 | | MOV | A,M |
| 603A 47 | 1830 | | MOV | B,A ,STORE #1 IN B |
| 603B 2C | 1831 | | INR | L ,#2 DISP |
| 603C 5E | 1832 | | MOV | E,M ,STORE #2 IN E |
| 603D 7E | 1833 | | MOV | A,M |
| 603E 87 | 1834 | | ADD | A , X 16 |
| 603F 87 | 1835 | | ADD | A |
| 6040 87 | 1836 | | ADD | A |
| 6041 87 | 1837 | | ADD | A |
| 6042 B0 | 1838 | | ORA | B ,2 & 3 - 16 + 2.5 |
| 6043 C9 | 1839 | | RET | |
| 6044 FE01 | 1840 | LNTH4. | CPI | 01H , < 15.1" ? |
| 6046 D4526C | 1841 | | CNC | LNTH1 |
| 6049 FE20 | 1842 | | CPI | 20H ,< 12 ? |
| 604B DC526C | 1843 | | CC | LNTH1 |
| 604E 2E45 | 1844 | LNTH2. | MVI | L,45H ,LENGTH REGISTER |
| 6050 77 | 1845 | | MOV | M,A |
| 6051 C9 | 1846 | | RET | |
| 6052 3E00 | 1847 | LNTH1. | MVI | A,00H ,MAX LENGTH - 15.0" |
| 6054 C9 | 1848 | | RET | |
| | 1849 | ;************************************************ | | |
| | 1850 | ; | IMAGE REDUCTION SUBROUTINE | |
| | 1851 | ;************************************************ | | |
| 6050 FE02 | 1852 | REDU. | CPI | 2H ,REDUCE KEY |
| 6057 C0 | 1853 | | RNZ | |
| 6058 CD376C | 1854 | REDU0. | CALL | LNTH3 |
| 605B FE64 | 1855 | | CPI | 64H ,MIN REDUCTION |
| 605D DCF26C | 1856 | | CC | REDU1 |
| 6060 2E44 | 1857 | REDU2. | MVI | L,44H |
| 6062 77 | 1858 | | MOV | M,A |
| 6063 3E0A | 1859 | | MVI | A,0AH ,#2 DISP X 16 |
| 6065 CDA96E | 1860 | | CALL | MULT ,RESULT IN D&E |
| 6068 78 | 1861 | | MOV | A,B ,#1 DISP TO A |
| 6069 83 | 1862 | | ADD | E ,TOTAL - MAG VALUE |
| 606A 47 | 1863 | | MOV | B,A ,HEX MAG VALUE TO B REG |
| 606B FE00 | 1864 | | CPI | 0H |
| 606D CAEC6C | 1865 | | JZ | REDU3 |
| 6070 11FF00 | 1866 | REDU6. | LXI | D,0FFH ,255 |
| 6073 CDA96E | 1867 | | CALL | MULT ,A X 255 IN D&E |

```
LOC   OBJ          SEQ          SOURCE STATEMENT

0C76 213200        1868         LXI    H,32H     ;50 = ROUNDING FACTOR
0C79 19            1869         DAD    D         ;RESULT IN H&L
0C7A 1E64          1870         MVI    E,64H     ;VALUE/100 = %
0C7C CD606E        1871         CALL   DIV       ;H&L/E = E
0C7F 3EDD          1872         MVI    A,0DDH    ;MAGIC FACTOR = 221
0C81 CDA90E        1873         CALL   MULT      ;221 * %(255)
0C84 21883F        1874         LXI    H,K6+86H  ;SNTR MULT FACTOR
0C87 72            1875         MOV    M,D       ;STORE IN RAM (H56)
0C88 58            1876         MOV    E,B       ;HEX MAG VALUE TO E
0C89 210606        1877         LXI    H,606H    ;1044 = MAGIC STEPPER FACTOR
0C8C CD606E        1878         CALL   DIV       ;RESULT IN E, REMAINDER IN D
0C8F 4A            1879         MOV    C,D       ;STORE REMAINDER IN C
0C90 3E64          1880         MVI    A,64H     ;100
0C92 90            1881         SUB    B         ;100 - HEX MAG %
0C93 C5            1882         PUSH   B         ;STORE IN STACK
0C94 47            1883         MOV    B,A       ;100 - HEX MAG % TO B
0C95 CDA90E        1884         CALL   MULT      ;(802/M) * (100 - M) = D&E
0C98 D5            1885         PUSH   D         ;STORE RESULT IN STACK
0C99 59            1886         MOV    E,C       ;REMAINDER TO E
0C9A 78            1887         MOV    A,B
0C9B CDA90E        1888         CALL   MULT      ;(100 - M) * REMAINDER
0C9E E1            1889         POP    H
0C9F C1            1890         POP    B         ;MAG IN B, REMAINDER IN C
0CA0 E5            1891         PUSH   H
0CA1 78            1892         MOV    A,B
0CA2 0F            1893         RRC              ;M/2 = ROUNDING FACTOR
0CA3 6F            1894         MOV    L,A
0CA4 2600          1895         MVI    H,0H
0CA6 19            1896         DAD    D         ;(100 - M) * R + M/2
0CA7 58            1897         MOV    E,B       ;MAG VALUE TO E
0CA8 CD606E        1898         CALL   DIV       ;H&L/E =E
0CAB E1            1899         POP    H
0CAC 1600          1900         MVI    D,0H
0CAE 19            1901         DAD    D         ;TOTAL = # STEPS
0CAF EB            1902         XCHG             ;RESULT TO D&E
0CB0 2A883F        1903         LHLD   K6+86H    ;LAST # STEPS FROM 100%
0CB3 EB            1904         XCHG
0CB4 22883F        1905         SHLD   K6+86H    ;STORE NEW # STEPS FROM 100%
0CB7 EB            1906         XCHG
0CB8 7A            1907         MOV    A,D
0CB9 2F            1908         CMA
0CBA 57            1909         MOV    D,A
0CBB 7B            1910         MOV    A,E
0CBC 2F            1911         CMA
0CBD 5F            1912         MOV    E,A
0CBE 13            1913         INX    D         ;TWOS COMPLEMENT OF D/E
0CBF 19            1914         DAD    D         ;16 BIT SUBTRACT (OLD - NEW)
0CC0 3E00          1915         MVI    A,0H
0CC2 BC            1916         CMP    H         ;CHECK MSB FOR BORROW (>=BOR.)
0CC3 DAF60C        1917         JC     REDU3     ;BORROW OCCURRED,UPDATE FWD CNTR
0CC6 22823F        1918         SHLD   K6+82H    ;REV CNTR
0CC9 21833F        1919 REDU4.  LXI    H,K6+83H  ;SET MAG FUNC. PENDING
0CCC 3601          1920         MVI    M,1H
0CCE 2E7C          1921         MVI    L,7CH     ;FUNC. MATCH WORD ADDR.
0CD0 3600          1922         MVI    M,0H
```

```
LOC   OBJ        SEQ         SOURCE STATEMENT

0CD2  78         1923        MOV    A,B          ;HEX MAG % FROM B REG
0CD3  00         1924        NOP
0CD4  1F         1925        RAR
0CD5  1F         1926        RAR
0CD6  1F         1927        RAR
0CD7  E60F       1928        ANI    0FH          ;STRIP 4
0CD9  3D         1929        DCR    A
0CDA  2E69       1930        MVI    L,69H        ;DCR FACTOR FOR STARTUP RAMP
0CDC  77         1931        MOV    M,A
0CDD  D1         1932 REDU7. POP    D            ;FALSE INSTRUCTION TO DCR
0CDE  C9         1933        RET                 ;STACK POINTER & RETURN
0CDF  7C         1934 REDU3. MOV    A,H
0CE0  2F         1935        CMA
0CE1  67         1936        MOV    H,A
0CE2  7D         1937        MOV    A,L
0CE3  2F         1938        CMA
0CE4  6F         1939        MOV    L,A
0CE5  23         1940        INX    H            ;TWOS COMPLEMENT
0CE6  22803F     1941        SHLD   KS+60H       ;FWD CNTR
0CE9  C3096C     1942        JMP    REDU4
0CEC  3E64       1943 REDU5. MVI    A,64H
0CEE  47         1944        MOV    B,A
0CEF  C3706C     1945        JMP    REDU6
0CF2  AF         1946 REDU1. XRA    A            ;100% BY DEFAULT
0CF3  47         1947        MOV    B,A
0CF4  5F         1948        MOV    E,A
0CF5  C9         1949        RET
                 1950 ;***********************************************
                 1951 ;      STEPPER MOTOR SUBROUTINE
                 1952 ;***********************************************
0CF6  0F         1953 TBL6:  DB     0FH          ;STEP 1
0CF7  1F         1954        DB     01FH         ;STEP 2
0CF8  3F         1955        DB     03FH         ;STEP 3
0CF9  8F         1956        DB     08FH         ;STEP 4
0CFA  AF         1957        DB     0AFH         ;STEP 5
0CFB  2F         1958        DB     02FH         ;STEP 6
0CFC  6F         1959        DB     06FH         ;STEP 7
0CFD  4F         1960        DB     04FH         ;STEP 8
0CFE  21403F     1961 MAGA.  LXI    H,KS+40H     ;ENABLE CNTR
0D01  7E         1962        MOV    A,M
0D02  FE01       1963        CPI    1H
0D04  C0         1964        RNZ
0D05  2E65       1965        MVI    L,65H        ;MAG FUNC. PENDING REG
0D07  BE         1966        CMP    M            ;REG A - 1H
0D08  C0         1967        RNZ                 ;RETURN IF MEM - 0
0D09  2E61       1968        MVI    L,61H        ;#2 INPUT
0D0B  3E08       1969        MVI    A,8H         ;LENS LIMIT SW
0D0D  A6         1970        ANA    M
0D0E  C2786D     1971        JNZ    MAGI         ;CHECK DIRECTION
0D11  2E64       1972 MAGJ.  MVI    L,64H        ;STEP CNTR
0D13  4E         1973        MOV    C,M          ;STORE IN C REG
0D14  2E60       1974        MVI    L,60H        ;FWD CNTR LSB
0D16  AF         1975        XRA    A
0D17  BE         1976        CMP    M
0D18  C2646D     1977        JNZ    MAGC
```

```
LOC  OBJ         SEQ            SOURCE STATEMENT 001B 2C          1978           INR     L       ;K6+61 FWD CNTR MSB
001C BE          1979           CMP     H
001D C2640D      1980           JNZ     MAGC
0020 2C          1981           INR     L       ;K6+62 REV CNTR LSB
0021 BE          1982           CMP     H
0022 C2360D      1983           JNZ     MAGB
0025 2C          1984           INR     L       ;K6+63 REV CNTR MSB
0026 BE          1985           CMP     H
0027 C2360D      1986           JNZ     MAGB
002A 2C          1987           INR     L
002B 2C          1988           INR     L
002C 77          1989           MOV     M,A     ;RESET MAG FUNC PEND. REG
002D 2E43        1990           MVI     L,43H   ;STATUS
002F 3EF7        1991           MVI     A,0F7H  ;RESET FUNC PEND BIT
0031 A6          1992           ANA     M
0032 77          1993           MOV     M,A
0033 C3200B      1994           JMP     K66     ;END OF SUBROUTINE
0036 0C          1995 MAGB.     INR     C
0037 2E06        1996           MVI     A,6H
0039 91          1997           SUB     C       ;CHECK IF > 8
003A DC3F0D      1998           CC      MAGD    ;RESET CNTR - 1
003D 11623F      1999 MAGG.     LXI     D,K6+62H ;REV CNTR ADDR.
0040 2E04        2000 MAGH.     MVI     L,04H   ;STEP CNTR
0042 71          2001           MOV     M,C     ;STORE NEW COUNT
0043 21F60C      2002           LXI     H,TBL6
0046 7D          2003           MOV     A,L
0047 0D          2004           DCR     C
0048 81          2005           ADD     C       ;GENERATE ADDRESS
0049 6F          2006           MOV     L,A     ;IN TBL6
004A DC620D      2007           CC      MAGE    ;ADJUST H REG W/ CARRY
004D 46          2008 MAGF.     MOV     B,M     ;FROM TBL6
004E 21403F      2009           LXI     H,K6+4DH ;#6 OUTPUT
0051 7E          2010           MOV     A,M
0052 F6F0        2011           ORI     0F0H
0054 A0          2012           ANA     B
0055 77          2013           MOV     M,A
0056 EB          2014           XCHG            ;FWD OR REV CNTR ADDR TO H/L
0057 5E          2015           MOV     E,M     ;LSB TO E
0058 2C          2016           INR     L
0059 56          2017           MOV     D,M     ;MSB TO D
005A 1B          2018           DCX     D
005B 72          2019           MOV     M,D
005C 2D          2020           DCR     L
005D 73          2021           MOV     M,E
005E C9          2022           RET             ;OUT OF SUBROUTINE
005F 0E01        2023 MAGD.     MVI     C,1H    ;RESET STEP CNTR
0061 C9          2024           RET
0062 24          2025 MAGE.     INR     H
0063 C9          2026           RET
0064 11603F      2027 MAGC.     LXI     D,K6+60H ;FWD CNTR ADDR
0067 0D          2028           DCR     C
0068 C2400D      2029           JNZ     MAGH
006B 0E06        2030           MVI     C,6H    ;RESET STEP CNTR
006D C33D0D      2031           JMP     MAGG
0070 3E01        2032 MAGI.     MVI     A,1H    ;RECOGNITION OF ACTIVE
```

```
LOC  OBJ        SEQ         SOURCE STATEMENT

0072 A6         2033        ANA    M          ;0 - INACTIVE
0073 3E00       2034        MVI    A,0H
0075 2E80       2035        MVI    L,80H
0077 CA8000     2036        JZ     MAGK       ;RESET REV CNTR IF FWD CNTR = 0
007A 77         2037        MOV    M,A        ;ZERO FWD CNTR
007B 2C         2038        INR    L
007C 77         2039        MOV    M,A
007D C31100     2040        JMP    MAGJ
0080 BE         2041 MAGK.  CMP    M          ;K8+80
0081 C21100     2042        JNZ    MAGJ
0084 2C         2043        INR    L          ;K8+81
0085 BE         2044        CMP    M
0086 C21100     2045        JNZ    MAGJ
0089 2C         2046        INR    L          ;K8+82
008A 77         2047        MOV    M,A        ;ZERO REV CNTR
008B 2C         2048        INR    L
008C 77         2049        MOV    M,A
008D C31100     2050        JMP    MAGJ
                2051 ;++++++++++++++++++++++++++++++++++++++++++++
                2052 ;     FUSER CONTROL SUBROUTINE
                2053 ;++++++++++++++++++++++++++++++++++++++++++++
0090 21603F     2054 FUSER. LXI    H,K8+60H   ;OF INPUT #1
0093 56         2055        MOV    D,M        ;TO D REG
0094 2E43       2056        MVI    L,43H      ;STATUS ADDR
0096 46         2057        MOV    B,M        ;TO B REG
0097 2E48       2058        MVI    L,48H      ;#1 OUTPUT
0099 7E         2059        MOV    A,M        ;TO A REG
009A F603       2060        ORI    3H         ;RESET FUSER BITS
009C 77         2061        MOV    M,A        ;BACK TO RAM
009D 5F         2062        MOV    E,A
009E 2E40       2063        MVI    L,40H      ;DCR CNTR ADDR
00A0 4E         2064        MOV    C,M        ;TO C REG
00A1 3E02       2065        MVI    A,2H
00A3 A9         2066        XRA    C          ;CHECK IF 2 OR 6 ENABLE
00A4 E603       2067        ANI    3H         ;STRIP OFF 6 BITS
00A6 CAD000     2068        JZ     FUSE3      ;IF 2 OR 6
00A9 2E41       2069        MVI    L,41H      ;STATE > 6?
00AB 3E06       2070        MVI    A,6H
00AD BE         2071        CMP    M
00AE DA000E     2072        JC     FUSE4
00B1 CA120E     2073        JZ     FUSE6
00B4 3E01       2074 FUSE3. MVI    A,1H       ;CHECK HEAT REQUEST
00B6 A2         2075        ANA    D          ;6 - TOO COLD
00B7 CA120E     2076        JZ     FUSE6      ;IF COLD ++++TEMP FOR 138 VOLTS, WAS FUSE8++++
00BA 3E40       2077        MVI    A,40H      ;CHECK WARMUP BIT (1=WARMUP)
00BC A0         2078        ANA    B
00BD CAD000     2079        JZ     FUSE3      ;LAMPS ON/OFF IF 6 = 0
00C0 3EBF       2080        MVI    A,0BFH
00C2 A0         2081        ANA    B          ;ZERO #6 BIT
00C3 2E43       2082        MVI    L,43H      ;STATUS ADDR
00C5 77         2083        MOV    M,A        ;RESET WARMUP BIT
00C6 C3ED00     2084        JMP    FUSE3      ;LAMPS ON/OFF TO RAM
00C9 3E01       2085 FUSE6. MVI    A,1H       ;CHECK VALUE OF DCR CNTR
00CB B9         2086        CMP    C          ; -1?
00CC C2D000     2087        JNZ    FUSE1
```

```
LOC  OBJ        SEQ          SOURCE STATEMENT

6DCF 3EFD       2088         MVI    A,0FDH   ;FUSER LAMP ON
6DD1 A3         2089         ANA    E
6DD2 5F         2090         MOV    E,A
6DD3 C3ED6D     2091         JMP    FUSE3    ;LAMPS ON/OFF TO RAM
6DD6 3E05       2092 FUSE1:  MVI    A,5H
6DD8 B9         2093         CMP    C        ;DCR CNTR = 5?
6DD9 C2ED6D     2094         JNZ    FUSE3    ;IF NOT
6DDC 3E40       2095         MVI    A,40H
6DDE A0         2096         ANA    B        ;CHECK WARMUP BIT
6DDF CAE96D     2097         JZ     FUSE2    ;IF B=0
6DE2 3EFC       2098         MVI    A,0FCH   ;BOTH LAMPS ON
6DE4 A3         2099         ANA    E
6DE5 5F         2100         MOV    E,A
6DE6 C3ED6D     2101         JMP    FUSE3
6DE9 3EFE       2102 FUSE2:  MVI    A,0FEH   ;PREHEAT LAMP ON
6DEB A3         2103         ANA    E
6DEC 5F         2104         MOV    E,A
6DED 2E40       2105 FUSE3:  MVI    L,40H    ;AC OUTPUT REG
6DEF 73         2106         MOV    M,E      ;LAMP ON/OFF COMMAND TO RAM
6DF0 3E0F       2107         MVI    A,0FH
6DF2 D303       2108         OUT    K3       ;REMOVE ENABLE
6DF4 7B         2109         MOV    A,E
6DF5 D302       2110         OUT    K6       ;LAMPS ON/OFF
6DF7 3E1E       2111         MVI    A,1EH    ;#1 ENABLE
6DF9 D303       2112         OUT    K3
6DFB 3E0F       2113         MVI    A,0FH    ;REMOVE ENABLE
6DFD D303       2114         OUT    K3
6DFF C9         2115         RET             ;OUT OF SUBROUTINE
6E00 2E32       2116 FUSE4:  MVI    L,32H    ;PHVG COUNTER
6E02 AF         2117         XRA    A
6E03 BE         2118         CMP    M
6E04 CAED6D     2119         JZ     FUSE3    ;LAMPS OFF
6E07 3E1E       2120         MVI    A,1EH    ;PHVG COUNTER <30?
6E09 BE         2121         CMP    M
6E0A DA126E     2122         JC     FUSE6
6E0D 0640       2123         MVI    B,40H    ;SET WARMUP BIT
6E0F C3C96D     2124         JMP    FUSE0
6E12 0600       2125 FUSE6:  MVI    B,0H     ;RESET WARMUP BIT
6E14 C3C96D     2126         JMP    FUSE0
                2127 ;*********************************************
                2128 ;      DIAGNOSTIC SUBROUTINE
                2129 ;*********************************************
6E17 210E3F     2130 DIAG:   LXI    H,K8+3EH ;#7 DISP
6E1A 7E         2131         MOV    A,M
6E1B FE6D       2132         CPI    6DH      ;"F." IN #7 ?
6E1D C28C6E     2133         JNZ    DIAG8    ;CHECK IF DIAG SW
6E20 2E38       2134 DIAG1:  MVI    L,38H    ;FUNCTION VALUE DISPLAY REG
6E22 3606       2135         MVI    M,6H
6E24 2E40       2136         MVI    L,40H    ;ENABLE CNTR
6E26 3E04       2137         MVI    A,4H
6E28 BE         2138         CMP    M        ;#4 ENABLE?
6E29 CA736E     2139         JZ     DIAG6
6E2C 3E08       2140         MVI    A,8H
6E2E BE         2141         CMP    M        ;#8 ENABLE ?
6E2F C2A76E     2142         JNZ    DISP
```

| LOC OBJ | SEQ | SOURCE STATEMENT | | |
|---|---|---|---|---|
| 0E32 AF | 2143 | XRA | A | |
| 0E33 2E09 | 2144 | MVI | L,09H | ;#2 DISP VAL |
| 0E35 46 | 2145 | MOV | B,M | ;GROUP # TO B REG |
| 0E36 B8 | 2146 | CMP | B | |
| 0E37 C8 | 2147 | RZ | | ;RETURN IF ZERO |
| 0E38 2D | 2148 | DCR | L | ;#1 DISP VAL |
| 0E39 56 | 2149 | MOV | D,M | ;WORD # TO D REG |
| 0E3A BA | 2150 | CMP | D | |
| 0E3B C8 | 2151 | RZ | | |
| 0E3C 2E0A | 2152 | MVI | L,0AH | ;#3 DISP |
| 0E3E 7E | 2153 | MOV | A,M | |
| 0E3F 3D | 2154 | DCR | A | |
| 0E40 0F | 2155 | RRC | | ,(A-1) X 40 |
| 0E41 0F | 2156 | RRC | | |
| 0E42 6F | 2157 | MOV | L,A | ;BASE ADDRESS TO L REG |
| 0E43 05 | 2158 DIAG0: | DCR | B | |
| 0E44 CA4E0E | 2159 | JZ | DIAG2 | |
| 0E47 3E08 | 2160 | MVI | A,8H | |
| 0E49 85 | 2161 | ADD | L | |
| 0E4A 6F | 2162 | MOV | L,A | |
| 0E4B C3430E | 2163 | JMP | DIAG0 | ;NEXT LOOP |
| 0E4E 15 | 2164 DIAG2: | DCR | D | |
| 0E4F CA560E | 2165 | JZ | DIAG3 | |
| 0E52 2C | 2166 | INR | L | ;BUILD ADDRESS |
| 0E53 C34E0E | 2167 | JMP | DIAG2 | |
| 0E56 46 | 2168 DIAG3: | MOV | B,M | ;FULL WORD TO B REG |
| 0E57 3E0F | 2169 DIAG4: | MVI | A,0FH | ;REMOVE ENABLES |
| 0E59 D303 | 2170 | OUT | K3 | |
| 0E5B 78 | 2171 | MOV | A,B | |
| 0E5C D302 | 2172 | OUT | K6 | |
| 0E5E 3E10 | 2173 | MVI | A,10H | ;DISP LATCH ENABLE |
| 0E60 D303 | 2174 | OUT | K3 | |
| 0E62 DB01 | 2175 | IN | K4 | ;KB WORD |
| 0E64 2F | 2176 | CMA | | |
| 0E65 2E73 | 2177 | MVI | L,73H | ;KB TEMP HOLD |
| 0E67 77 | 2178 | MOV | M,A | |
| 0E68 3E0F | 2179 | MVI | A,0FH | ;#8 DISP ENABLE |
| 0E6A D303 | 2180 | OUT | K3 | |
| 0E6C 3E2F | 2181 | MVI | A,2FH | ;LATCH #8 DISP ENABLE |
| 0E6E D303 | 2182 | OUT | K3 | |
| 0E70 3E0F | 2183 | MVI | A,0FH | ;REMOVE ENABLE |
| 0E72 D303 | 2184 | OUT | K3 | |
| 0E74 C9 | 2185 | RET | | |
| 0E75 2E41 | 2186 DIAG6: | MVI | L,41H | ;STATE CNTR ADDR |
| 0E77 46 | 2187 | MOV | B,M | |
| 0E78 3E0F | 2188 | MVI | A,0FH | |
| 0E7A A0 | 2189 | ANA | B | |
| 0E7B 47 | 2190 | MOV | B,A | |
| 0E7C 2E0B | 2191 | MVI | L,0BH | ;#4 BIN VAL ADDR. |
| 0E7E 70 | 2192 | MOV | M,B | |
| 0E7F AF | 2193 | XRA | A | |
| 0E80 B8 | 2194 | CMP | B | ;STATE - 0 ? |
| 0E81 CA870E | 2195 | JZ | DIAG7 | |
| 0E84 C3A709 | 2196 | JMP | DISP | |
| 0E87 0E04 | 2197 DIAG7: | MVI | C,4H | ;ZERO IMAGE |

| LOC OBJ | SEQ | SOURCE STATEMENT | | |
|---|---|---|---|---|
| 6E89 C3366A | 2198 | JMP | D2 | |
| 6E8C FE06 | 2199 DIAG8: | CPI | 8H | |
| 6E8E C2A769 | 2200 | JNZ | DISP | ;OUT OF SUBR. |
| 6E91 2E61 | 2201 | MVI | L,61H | ;#2 INPUT |
| 6E93 7E | 2202 | MOV | A,M | |
| 6E94 E604 | 2203 | ANI | 4H | ;DIAGNOSTIC SW ? |
| 6E96 CAA769 | 2204 | JZ | DISP | ;OUT OF SUBR. |
| 6E99 CD5D06 | 2205 | CALL | CLR | |
| 6E9C 2E0E | 2206 | MVI | L,0EH | ;#7 DISP |
| 6E9E 3660 | 2207 | MVI | M,60H | ;"F." TO #7 DISP |
| 6EA0 2E48 | 2208 | MVI | L,48H | ;#4 OUTPUT |
| 6EA2 3EDF | 2209 | MVI | A,0DFH | ;DIAG. LAMP ON |
| 6EA4 A6 | 2210 | ANA | M | |
| 6EA5 77 | 2211 | MOV | M,A | |
| 6EA6 C32806E | 2212 | JMP | DIAG1 | |
| | 2213 | ;++++++++++++++++++++++++++++++++++++++++ | | |
| | 2214 | ; 8 BIT MULTIPLY : D&E = A * E | | |
| | 2215 | ;++++++++++++++++++++++++++++++++++++++++ | | |
| 6EA9 67 | 2216 MULT: | MOV | H,A | ;MOVE MULTIPLIER TO H |
| 6EAA 1600 | 2217 | MVI | D,0H | ;SET D&L TO 0 |
| 6EAC 6A | 2218 | MOV | L,D | |
| 6EAD 3E08 | 2219 | MVI | A,8H | ;LOOP COUNTER |
| 6EAF 29 | 2220 MULT1. | DAD | H | ;SHIFT RESULT, MLTPY |
| 6EB0 D2B46E | 2221 | JNC | MULT2 | ;IF MSB SET ADD MLTPCND |
| 6EB3 19 | 2222 | DAD | D | ;H&L = H&L + D&E |
| 6EB4 3D | 2223 MULT2. | DCR | A | ;DECREMENT LOOP COUNTER |
| 6EB5 C2AF6E | 2224 | JNZ | MULT1 | |
| 6EB8 EB | 2225 | XCHG | | ;RESULT IN D&E |
| 6EB9 263F | 2226 | MVI | H,K7 | ;PRESERVE ADDR CODE |
| 6EBB C9 | 2227 | RET | | |
| | 2228 | ;++++++++++++++++++++++++++++++++++++++++ | | |
| | 2229 | ; 16/8 BIT DIVIDE . E = (H&L)/E , REMAINDER IN D | | |
| | 2230 | ;++++++++++++++++++++++++++++++++++++++++ | | |
| 6EBC 1608 | 2231 DIV: | MVI | D,8H | ;LOOP COUNTER |
| 6EBE 29 | 2232 DIV1. | DAD | H | ;SHIFT DIVIDEND & RESULT LEFT |
| 6EBF 7C | 2233 | MOV | A,H | ;COMPARE H |
| 6EC0 93 | 2234 | SUB | E | |
| 6EC1 DAC66E | 2235 | JC | DIV2 | ;WONT SUBTRACT, NO CHANGE |
| 6EC4 67 | 2236 | MOV | H,A | ;H=H-E, SET LSB OF QUOTIENT |
| 6EC5 2C | 2237 | INR | L | |
| 6EC6 15 | 2238 DIV2. | DCR | D | ;LOOP COUNTER |
| 6EC7 C2BE6E | 2239 | JNZ | DIV1 | |
| 6ECA EB | 2240 | XCHG | | ;STORE RESULT IN D&E |
| 6ECB 263F | 2241 | MVI | H,K7 | ;PRESERVE ADDR CODE |
| 6ECD C9 | 2242 | RET | | |
| | 2243 | ;++++++++++++++++++++++++++++++++++++++++ | | |
| 6ECE 3E09 | 2244 LAST: | MVI | A,9H | ;SET #6 ENABLE |
| 6ED0 D303 | 2245 | OUT | K3 | |
| 6ED2 DB01 | 2246 | IN | K4 | ;INTERRUPTS |
| 6ED4 E6E0 | 2247 | ANI | 0E0H | ;CHECK IF INT7, 6, OR 5 |
| 6ED6 C2E66E | 2248 | JNZ | LAST2 | |
| 6ED9 3E08 | 2249 | MVI | A,8H | ;CLEAR MASK |
| 6EDB 30 | 2250 LAST1. | DB | K28 | ;SIM INSTRUCTION FOR 8085 |
| 6EDC 31FF3F | 2251 | LXI | SP,K12 | ;RESET STACK POINTER |
| 6EDF 3E12 | 2252 | MVI | A,12H | ;RETRIGGER WATCHDOG TIMER |

| LOC OBJ | SEQ | SOURCE STATEMENT | | | |
|---|---|---|---|---|---|
| 6EE1 D303 | 2203 | | OUT | K3 | ;AND REMOVE ENABLE |
| 6EE3 28 | 2204 | | DB | K19 | ;READ INT MASK |
| 6EE4 FB | 2205 | | EI | | |
| 6EE5 76 | 2206 | | HLT | | ;WAIT HERE FOR INTERRUPT |
| 6EE6 3E0C | 2207 | LAST2. | MVI | A,6CH | ;MASK TIMER INTERRUPT |
| 6EE8 C3066E | 2208 | | JMP | LAST1 | |
| 0000 | 2209 | | END | 0000H | |

PUBLIC SYMBOLS

EXTERNAL SYMBOLS

USER SYMBOLS

[symbol table illegible]

ASSEMBLY COMPLETE, NO ERRORS

What is claimed is:

1. A digital motor control system for controlling the speed of a variable speed motor, comprising in combination:

a motor speed sensor coupled to said variable speed motor and producing a motor speed word;

an input of a predetermined desired speed for said variable speed motor producing a target word indicative thereof;

a programmed digital microprocessor coupled to said target word and to said motor speed word of said motor speed sensor for calculating a motor control word which sequentially compares said motor speed words with said target words to form a succession of error words, which sequentially compares said error words with each other to develop an acceleration word, which calculates a correction word utilizing said error words and said acceleration word and which alters said motor control word by an amount proportional to said correction word; and a driver coupled to said motor control word of said calculating means and coupled to said variable speed motor to control the speed of said variable speed motor responsive to said motor control word;

such that the speed of said variable speed motor converges with said predetermined desired speed for said variable speed motor.

2. A digital motor control system for controlling the speed of a variable speed motor, comprising in combination:

a motor speed sensor coupled to said variable speed motor and producing a motor speed word;

an input of a predetermined desired speed for said variable speed motor;

a programmable digital microprocessor coupled to said input word and to said motor speed word of said motor speed sensor for sensing said input and producng a reference speed word for calculating a speed ratio constant word indicative of the ratio between said motor speed word and said reference speed word, for calculating a target speed word from said reference speed word and said speed ratio constant word and for calculating a motor control word which sequentially compares said motor speed words with said target words to form a succession of error words, which sequentially compares said error words with each other to develop an acceleration word, which calculates a correction word utilizing said error words and said acceleration word and which alters said motor control word by an amount proportional to said correction word; and a driver coupled to said motor control word of said calculating means and coupled to said variable speed motor to control the speed of said variable speed motor responsive to said motor control word;

such that the speed of said variable speed motor converges with said predetermined desired speed for said variable speed motor.

3. A variable magnification ratio photocopier having a lens system, a variable speed scanning system, and a rotatable drum having a photosensitive surface which cooperate to produce a photocopy of an original document, of the type wherein the speed of said movable scanning system and the position of said lens system are altered to control the magnification ratio of said photocopier comprising:

a variable speed motor for driving said scanning system;

a constant speed motor for driving said photosensitive drum at a reference speed; and a programmed digital microprocessor for controlling the speed of said variable speed motor which establishes an initial value of a motor control word, senses the speed of said variable speed motor and produces a motor speed word, senses the speed of said rotatable drum and produces a reference speed word, senses a preselected magnification ratio and produces a speed ratio constant word indicative of said preselected magnification ratio, calculates a target word from said reference speed word and said speed ratio constant word indicative of the desired speed of said variable speed motor, compares sequential values of said motor speed word with said target word to form a succession of error word values, stores successive values of the error word, compares sequential values of said error word with each other to develop an acceleration word, calculates a correction word from one of said error words and said acceleration word, and alters said motor control word by an amount proportional to said correction word such that the speed of said variable speed motor converges with said desired speed of said variable speed motor.

* * * * *